United States Patent
Kuba

(10) Patent No.: US 8,564,756 B2
(45) Date of Patent: Oct. 22, 2013

(54) OPTICAL SYSTEM AND IMAGE PICK-UP DEVICE PROVIDED WITH THE SAME

(75) Inventor: Keiichi Kuba, Koganei (JP)

(73) Assignee: Olympus Corporation, Tokyo (JP)

( * ) Notice: Subject to any disclaimer, the term of this patent is extended or adjusted under 35 U.S.C. 154(b) by 626 days.

(21) Appl. No.: 12/135,456

(22) Filed: Jun. 9, 2008

(65) Prior Publication Data

US 2008/0309835 A1    Dec. 18, 2008

(30) Foreign Application Priority Data

Jun. 12, 2007    (JP) .................................. 2007-155662

(51) Int. Cl.
*G02F 1/13* (2006.01)

(52) U.S. Cl.
USPC .......................................... 349/201; 349/202

(58) Field of Classification Search
USPC .......................................... 349/200, 201, 202
See application file for complete search history.

(56) References Cited

U.S. PATENT DOCUMENTS

| | | | | |
|---|---|---|---|---|
| 5,071,229 A | * | 12/1991 | Oaki et al. | 349/200 |
| 5,648,859 A | * | 7/1997 | Hirabayashi et al. | 349/9 |
| 7,773,489 B2 | * | 8/2010 | Murata et al. | 369/112.02 |
| 2006/0072211 A1 | * | 4/2006 | Imamura | 359/686 |
| 2006/0114534 A1 | * | 6/2006 | Batchko | 359/15 |
| 2008/0055536 A1 | * | 3/2008 | Shimozono et al. | 349/200 |

OTHER PUBLICATIONS

Sweatt, William ., "Mathematical equivalence between a holographic optical element and an ultra-high index lens," J. Optical Soc. Am., vol. 69, No. 3, Mar. 1979, pp. 486-487.

* cited by examiner

*Primary Examiner* — Edward Glick
*Assistant Examiner* — Dennis Y Kim
(74) *Attorney, Agent, or Firm* — Pillsbury Winthrop Shaw Pittman, LLP

(57) ABSTRACT

An optical system includes at least one lens and a liquid crystal optical element. The liquid crystal optical element is constructed so that a first liquid crystal lens and a second liquid crystal lens are oppositely arranged so that orientation directions cross at right angles with each other in a plane perpendicular to the optical axis, a voltage applied to the liquid crystal optical element is controlled and a shift of a focal position relative to incident light from a different object point is corrected, and when the liquid crystal optical element does not have a ray deflecting action, a far object point is brought into focus, while when the liquid crystal optical element has the ray deflecting action, a near object point is brought into focus.

10 Claims, 14 Drawing Sheets

FIG.1A
FIG.1B
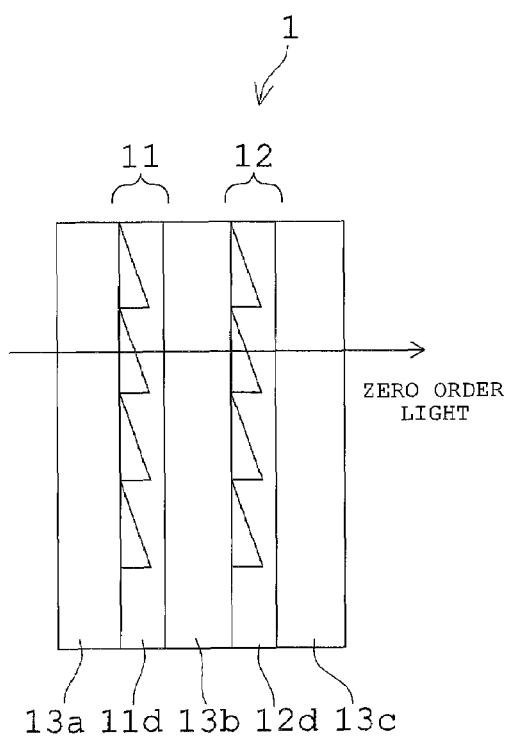
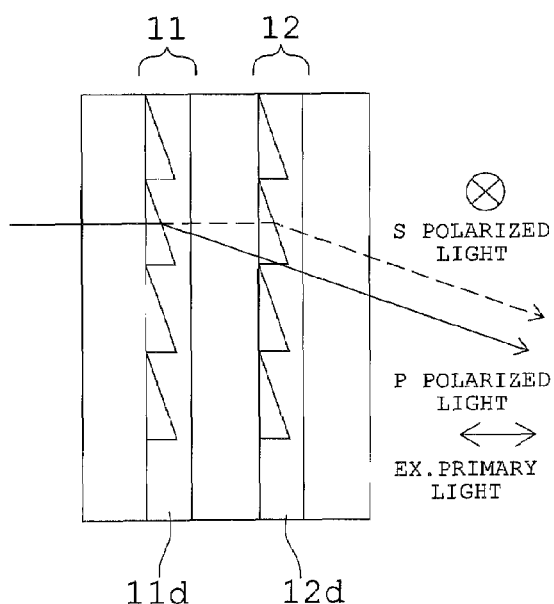

TANGENTIAL  1.00 RELATIVE FIELD HEIGHT (31.00)°

SAGITTAL 0.90 RELATIVE FIELD HEIGHT (28.59)°

0.70 RELATIVE FIELD HEIGHT (23.19)°

0.40 RELATIVE FIELD HEIGHT (13.85)°

0.00 RELATIVE FIELD HEIGHT (0.000)°

———————— 656.27 nm
– – – – – – – 587.56 nm
— · — · — · — 546.07 nm
— — — — — 486.13 nm
– · · – · · – 435.84 nm

FIG.5A
TANGENTIAL  1.00 RELATIVE FIELD HEIGHT (30.81)°
FIG.5B
SAGITTAL
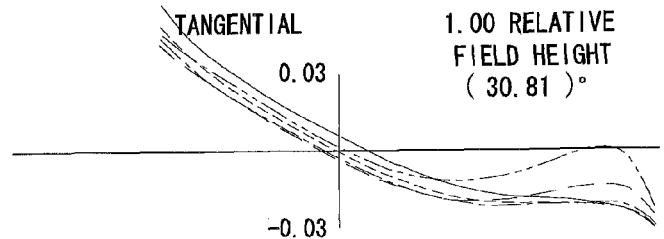
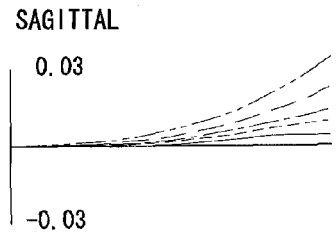
FIG.5C  0.90 RELATIVE FIELD HEIGHT (28.42)°
FIG.5D
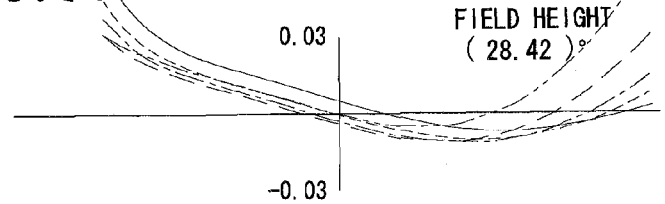
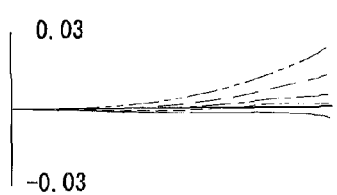
FIG.5E  0.70 RELATIVE FIELD HEIGHT (23.05)°
FIG.5F
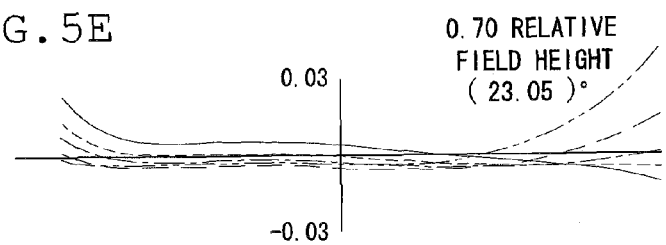
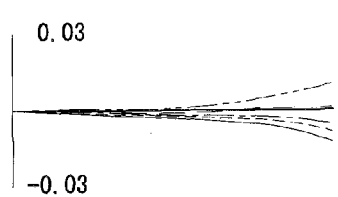
FIG.5G  0.40 RELATIVE FIELD HEIGHT (13.76)°
FIG.5H
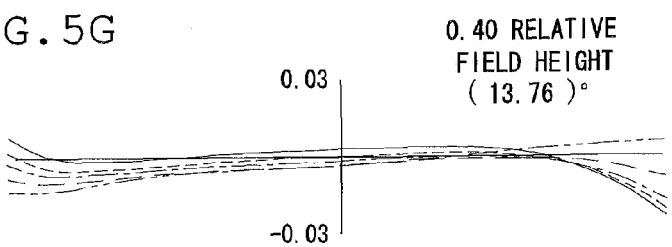
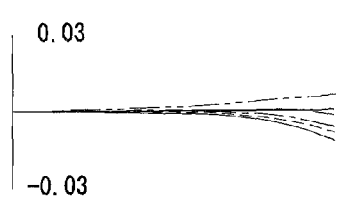
FIG.5I  0.00 RELATIVE FIELD HEIGHT (0.000)°
FIG.5J
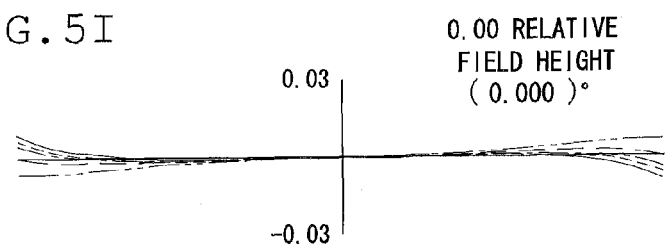
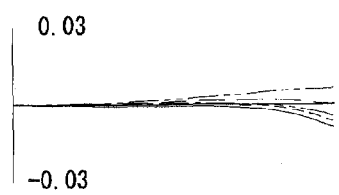
```
——————————  656.27 nm
------------  587.56 nm
—-—-—-—-—-  546.07 nm
— — — — —   486.13 nm
—--—--—--—  435.84 nm
```

FIG. 6A TANGENTIAL 1.00 RELATIVE FIELD HEIGHT (30.82)° FIG. 6B SAGITTAL
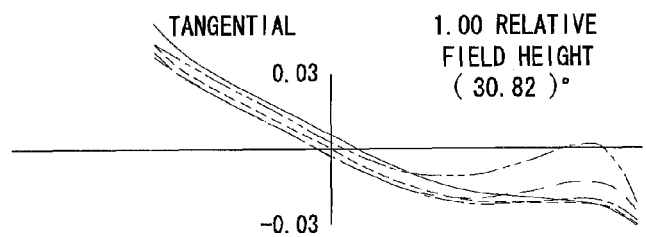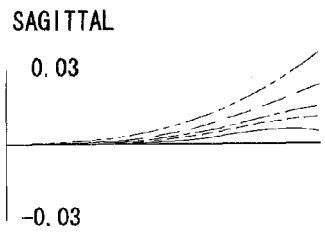
FIG. 6C 0.90 RELATIVE FIELD HEIGHT (28.43)° FIG. 6D
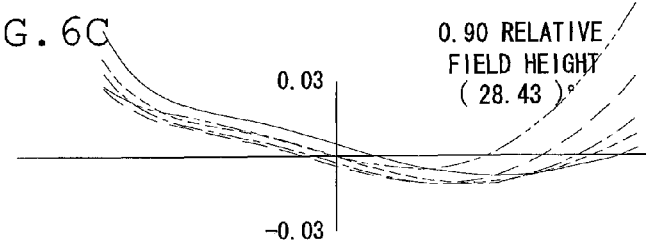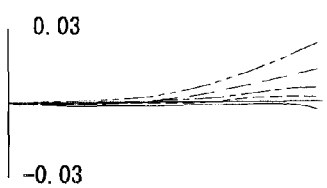
FIG. 6E 0.70 RELATIVE FIELD HEIGHT (23.06)° FIG. 6F
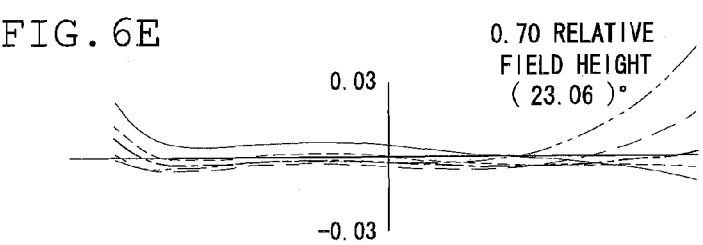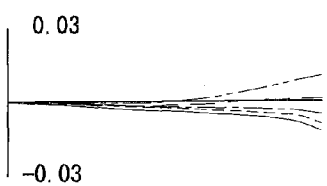
FIG. 6G 0.40 RELATIVE FIELD HEIGHT (13.77)° FIG. 6H
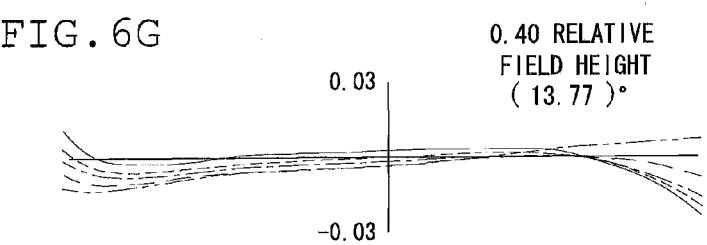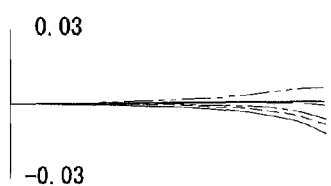
FIG. 6I 0.00 RELATIVE FIELD HEIGHT (0.000)° FIG. 6J
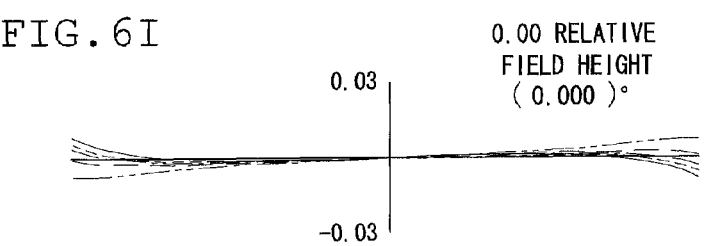
```
——————————  656.27 nm
— — — — — —  587.56 nm
— · — · — ·  546.07 nm
— — — — — —  486.13 nm
— ·· — ·· —  435.84 nm
```

FIG.8A
FIG.8B
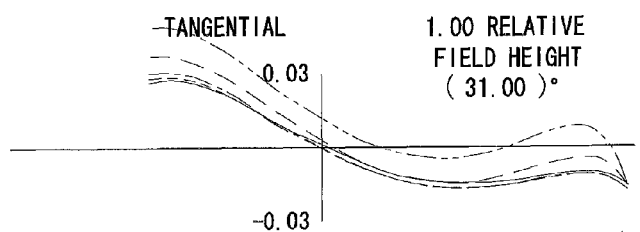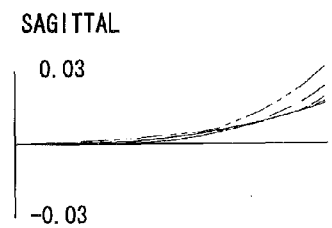
1.00 RELATIVE FIELD HEIGHT ( 31.00 )°
FIG.8C
FIG.8D
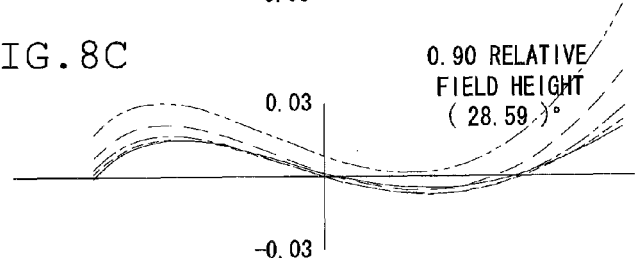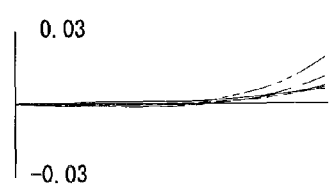
0.90 RELATIVE FIELD HEIGHT ( 28.59 )°
FIG.8E
FIG.8F
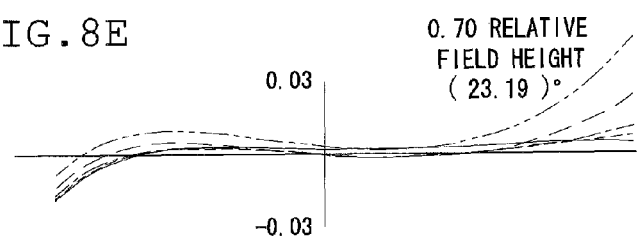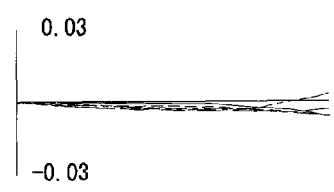
0.70 RELATIVE FIELD HEIGHT ( 23.19 )°
FIG.8G
FIG.8H
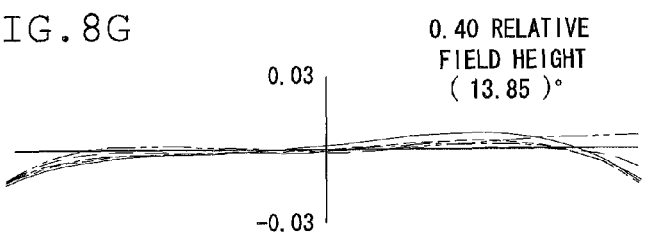
0.40 RELATIVE FIELD HEIGHT ( 13.85 )°
FIG.8I
FIG.8J
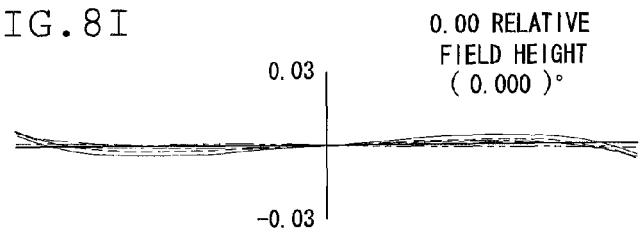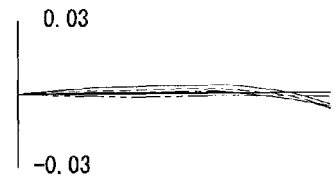
0.00 RELATIVE FIELD HEIGHT ( 0.000 )°
――――――― 656.27 nm
--------- 587.56 nm
—·—·—·— 546.07 nm
— — — — 486.13 nm
—··—··— 435.84 nm FIG.10A    1.00 RELATIVE FIELD HEIGHT (30.74)°    FIG.10B
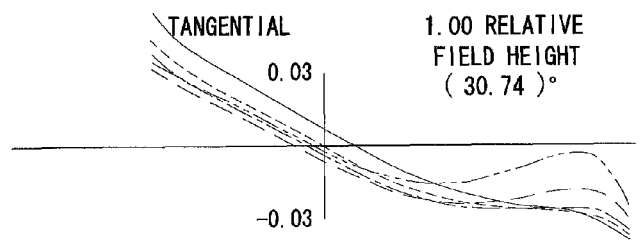 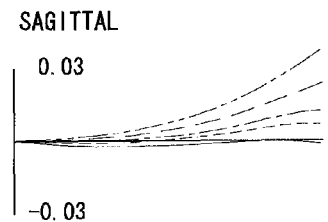
FIG.10C    0.90 RELATIVE FIELD HEIGHT (28.35)°    FIG.10D
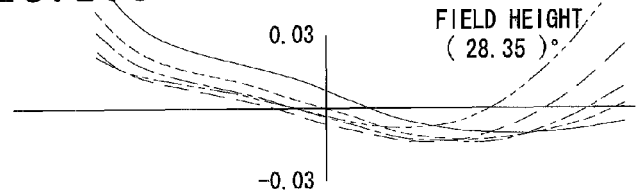 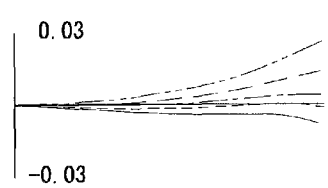
FIG.10E    0.70 RELATIVE FIELD HEIGHT (23.00)°    FIG.10F
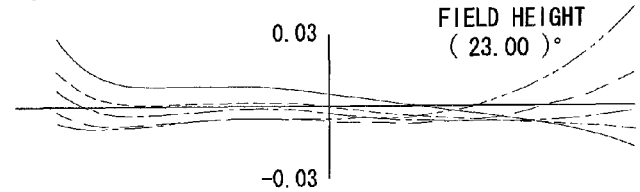 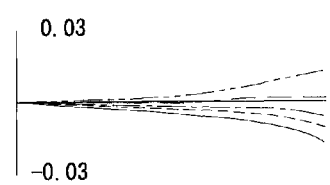
FIG.10G    0.40 RELATIVE FIELD HEIGHT (13.74)°    FIG.10H
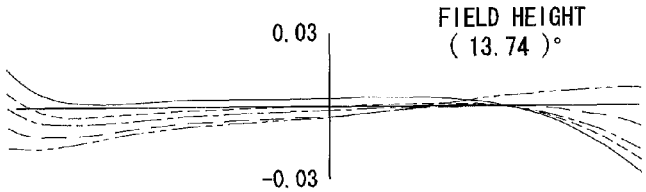 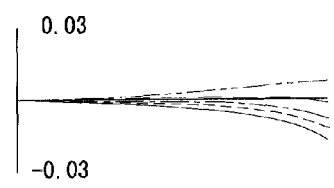
FIG.10I    0.00 RELATIVE FIELD HEIGHT (0.000)°    FIG.10J
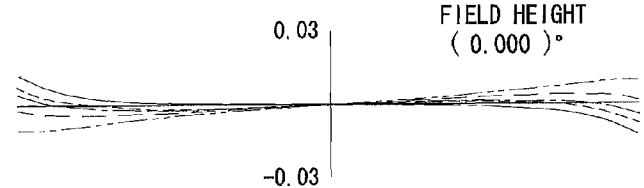 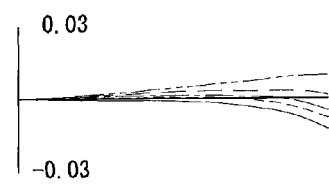
——————— 656.27 nm
- - - - - - - 587.56 nm
— — — · — 546.07 nm
— — — — 486.13 nm
— · · — · · — 435.84 nm FIG.13A TANGENTIAL  1.00 RELATIVE FIELD HEIGHT (32.39)°  FIG.13B SAGITTAL
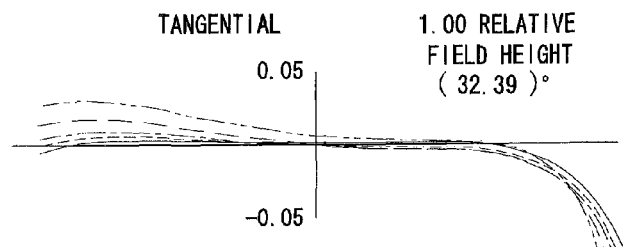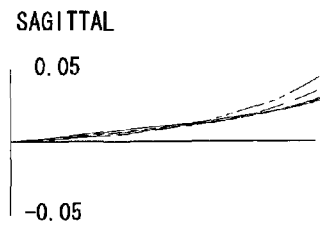
FIG.13C  0.90 RELATIVE FIELD HEIGHT (29.57)°  FIG.13D
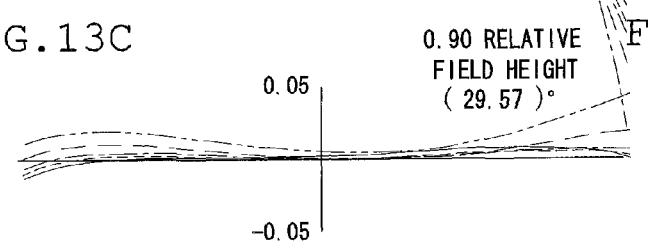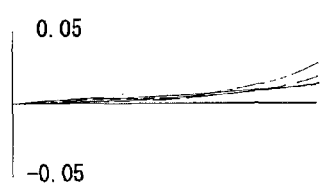
FIG.13E  0.70 RELATIVE FIELD HEIGHT (23.58)°  FIG.13F
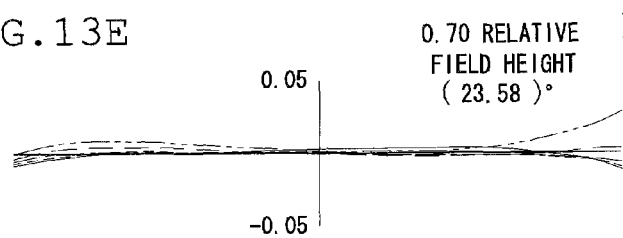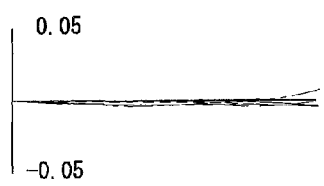
FIG.13G  0.40 RELATIVE FIELD HEIGHT (13.83)°  FIG.13H
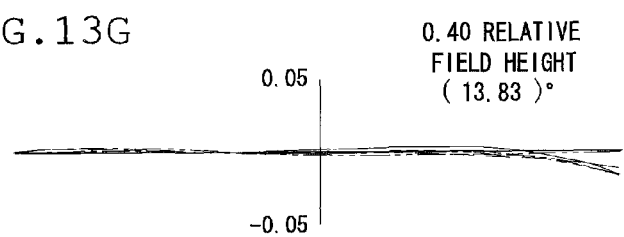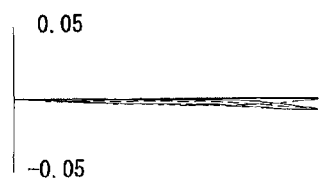
FIG.13I  0.00 RELATIVE FIELD HEIGHT (0.000)°  FIG.13J
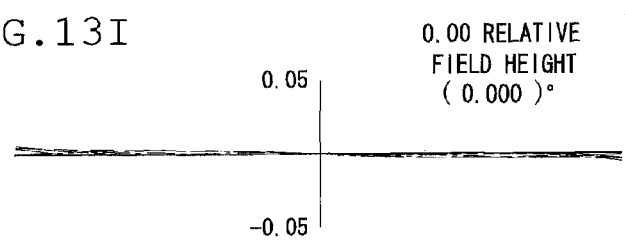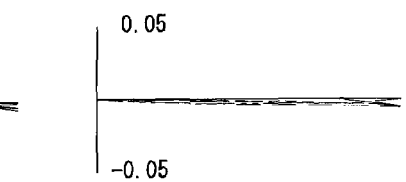
```
———————————  656.27 nm
— — — — — —  587.56 nm
—·—·—·—·—·—  546.07 nm
— — — — —    486.13 nm
—··—··—··—·· 435.84 nm
```

FIG.14A
FIG.14B
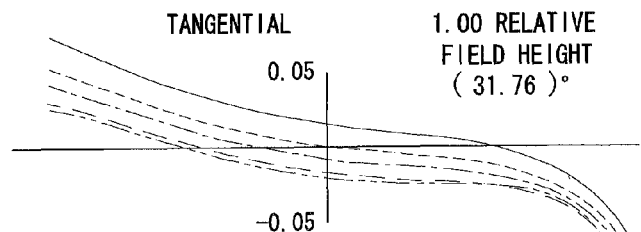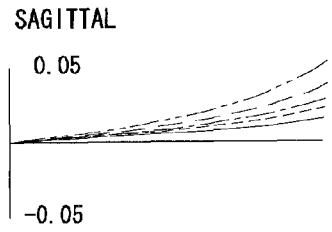
FIG.14C
FIG.14D
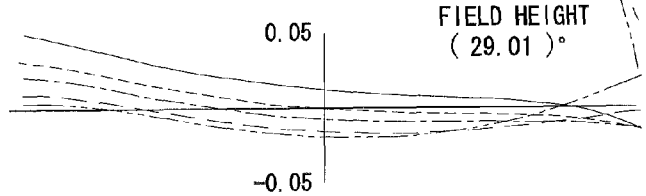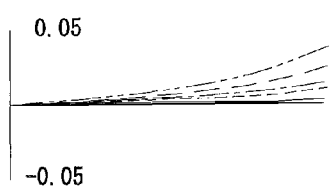
FIG.14E
FIG.14F
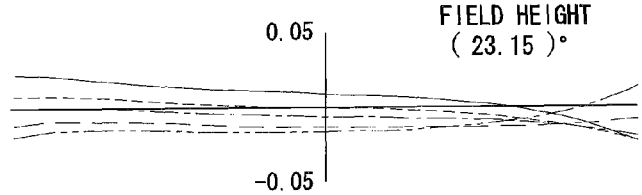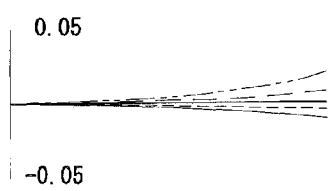
FIG.14G
FIG.14H
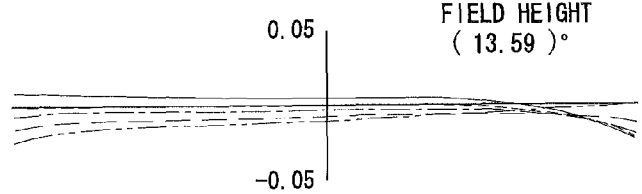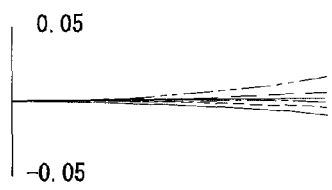
FIG.14I
FIG.14J
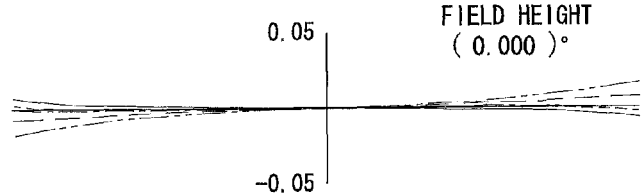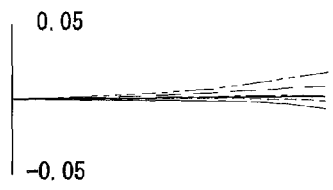
```
————————  656.27 nm
— — — — —  587.56 nm
— · — · —  546.07 nm
— — — —    486.13 nm
— · · — · ·  435.84 nm
```

FIG.15A TANGENTIAL 1.00 RELATIVE FIELD HEIGHT (31.80)° FIG.15B SAGITTAL
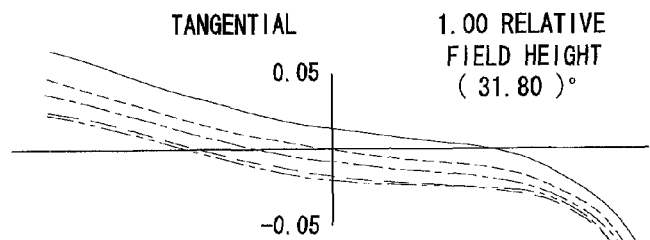
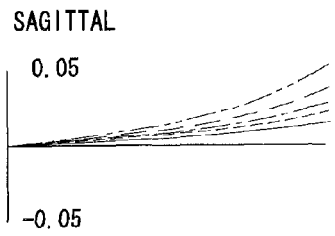
FIG.15C 0.90 RELATIVE FIELD HEIGHT (29.04)° FIG.15D
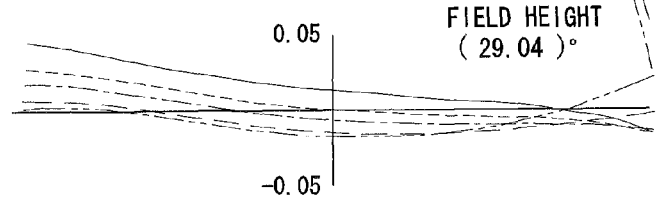
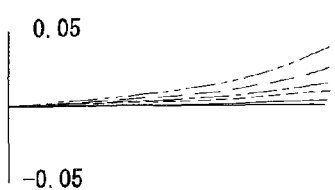
FIG.15E 0.70 RELATIVE FIELD HEIGHT (23.17)° FIG.15F
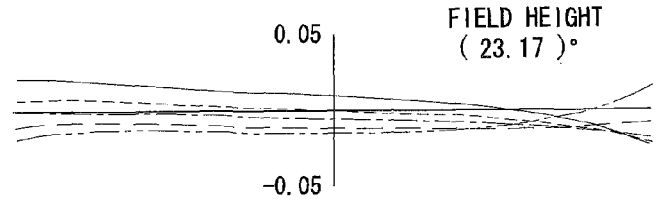
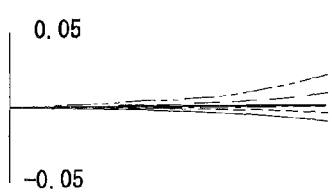
FIG.15G 0.40 RELATIVE FIELD HEIGHT (13.60)° FIG.15H
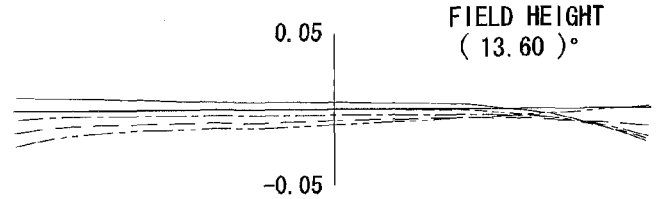
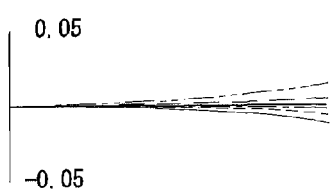
FIG.15I 0.00 RELATIVE FIELD HEIGHT (0.000)° FIG.15J
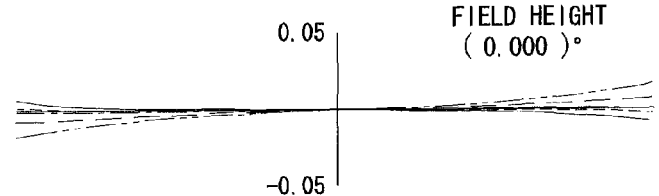
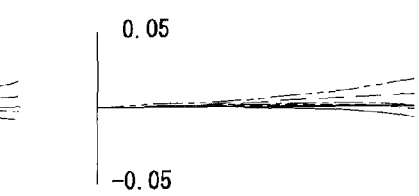
- 656.27 nm
- 587.56 nm
- 546.07 nm
- 486.13 nm
- 435.84 nm

US 8,564,756 B2

OPTICAL SYSTEM AND IMAGE PICK-UP DEVICE PROVIDED WITH THE SAME

This application claims benefits of Japanese Patent Application No. 2007-155662 filed in Japan on Jun. 12, 2007, the contents of which are incorporated herein by reference.

BACKGROUND OF THE INVENTION

1. Field of the Invention

This invention relates to an imaging optical system, and more specifically, to an optical system provided with a variable optical-property element, such as a liquid crystal lens, and an image pick-up device provided with the optical system. Devices for photographing still images and moving pictures with optical apparatuses, such as cameras, microscopes, endoscopes, telescopes, and scanners, come into the category of this image pick-up device.

2. Description of Related Art

In general, focusing of an imaging optical system is performed by moving a lens along the optical axis. On the other hand, an optical system is known which is designed so that a variable focal-length lens, such as a liquid crystal lens, is used and thereby a magnification change and the focusing are performed without moving a lens system.

For such a liquid crystal lens, a polarizing plate is required. In another optical system, a variable focal-length mechanism is realized in which a first liquid crystal lens and a second liquid crystal lens are oppositely arranged so that orientation directions cross at right angles with each other in a plane perpendicular to the optical axis and thereby the polarizing plate is not required.

On the other hand, a diffractive liquid crystal lens is known which is constructed so that a relief pattern of saw-shaped cross section is formed as the liquid crystal lens and energy is concentrated with respect to diffracted light of a particular order of diffraction (diffraction efficiency is optimized).

SUMMARY OF THE INVENTION

The optical system of one aspect according to the present invention comprises at least one lens and a liquid crystal optical element. The liquid crystal optical element is constructed so that a first liquid crystal lens and a second liquid crystal lens are oppositely arranged so that orientation directions cross at right angles with each other in a plane perpendicular to the optical axis, a voltage applied to the liquid crystal optical element is controlled and a shift of a focal position relative to incident light from a different object point is corrected, and when the liquid crystal optical element does not have a ray deflecting action, a far object point is brought into focus, while when the liquid crystal optical element has the ray deflecting action, a near object point is brought into focus.

In the optical system of another aspect of the present invention, it is desirable that each of the first diffractive liquid crystal lens and the second diffractive liquid crystal lens is a Fresnel liquid crystal lens.

In the optical system of a further aspect of the present invention, it is desirable to satisfy the following condition:

$$0 < |(f1-f2)/f1| \leq 0.5 \qquad (1)$$

where f1 is the focal length of the first diffractive liquid crystal lens with preset order light relative to incident light in one polarization direction, undergoing the ray deflecting action in the first diffractive liquid crystal lens and f2 is the focal length of the second diffractive liquid crystal lens with order light identical with the preset order light relative to incident light in the other polarization direction perpendicular to the one polarization direction, undergoing the ray deflecting action in the second diffractive liquid crystal lens.

In the optical system of a still further aspect of the present invention, it is desirable to satisfy the following condition:

$$|\Delta/f1| \leq 0.6 \qquad (2)$$

where $\Delta$ is a spacing between the first diffractive liquid crystal lens and the second diffractive liquid crystal lens and f is the focal length of the optical system.

The image pick-up device according to the present invention includes the optical system of the present invention, an image sensor, and a zoom optical system.

These and other features and advantages of the present invention will become apparent from the following detailed description of the preferred embodiments when taken in conjunction with the accompanying drawings.

BRIEF DESCRIPTION OF THE DRAWINGS

FIGS. 1A and 1B are conceptual views showing a fundamental structure and operating principle of the liquid crystal optical element according to a first aspect. FIG. 1A shows a state of action to which an incident ray is subjected where voltages are not applied to liquid crystal lenses and FIG. 1B shows a state of action to which the incident ray is subjected where the voltages are applied to the liquid crystal lenses.

FIGS. 5A-5J are transverse aberration diagrams in focusing on a near point (in which only a liquid crystal lens for p-polarized light is actuated) in the optical system of Embodiment 1.

FIGS. 6A-6J are transverse aberration diagrams in focusing on a near point (in which only a liquid crystal lens for s-polarized light is actuated) in the optical system of Embodiment 1.

FIGS. 8A-8J are transverse aberration diagrams in focusing on the infinite object point in the optical system of Embodiment 2.

FIGS. 10A-10J are transverse aberration diagrams in focusing on a near point (in which only a liquid crystal lens for s-polarized light is actuated) in the optical system of Embodiment 2.

FIGS. 13A-13J are transverse aberration diagrams in focusing on the infinite object point in the optical system of Embodiment 3.

FIGS. 14A-14J are transverse aberration diagrams in focusing on a near point (in which only a liquid crystal lens for p-polarized light is actuated) in the optical system of Embodiment 3.

FIGS. 15A-15J are transverse aberration diagrams in focusing on a near point (in which only a liquid crystal lens for s-polarized light is actuated) in the optical system of Embodiment 3.

DETAILED DESCRIPTION OF THE PREFERRED EMBODIMENTS

Figure 2:
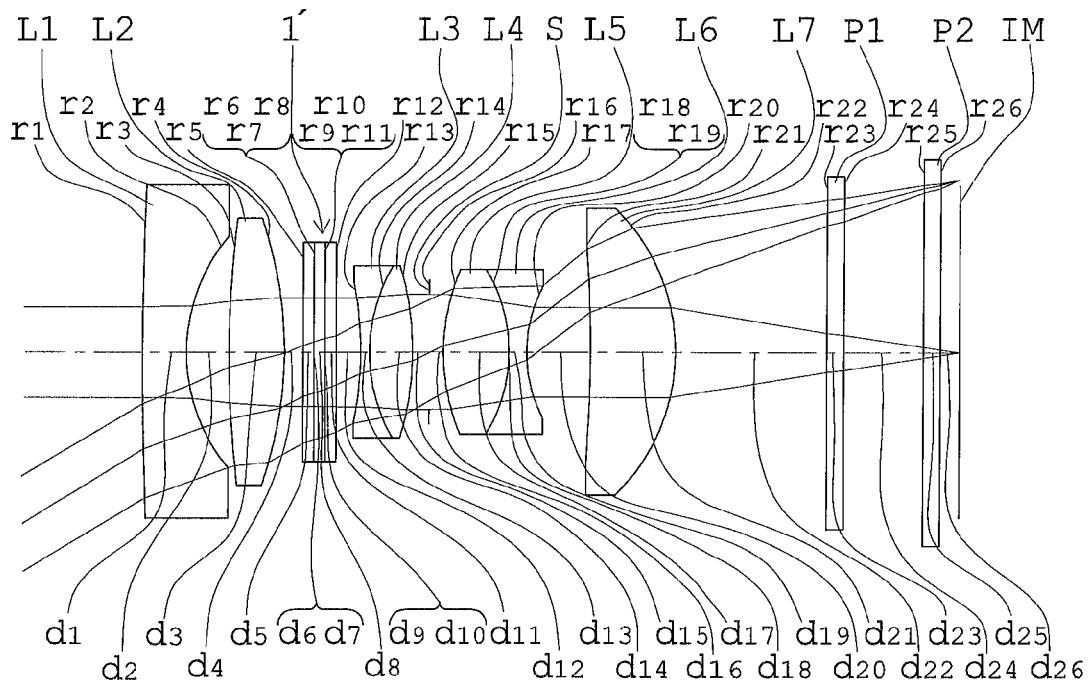
FIG. 2 is a sectional view showing the arrangement of the optical system, developed along the optical axis, in a state of focusing on an infinite object point, according to Embodiment 1.

Before undertaking the description of the embodiments, favorable aspects of the pre-sent invention will be explained. For the convenience of the description, linearly polarized light in one polarization direction, of two types of linearly polarized light having planes of polarization perpendicular to each other, is taken as p-polarized light and linearly polarized light in the other polarization direction is taken as s-polarized light.

The optical system of the present invention has at least one lens and a liquid crystal optical element. The liquid crystal optical element is constructed to control the voltage applied to the liquid crystal optical element and to make correction for the shift of the focal position (focusing) relative to incident light from a different object point.

FIGS. 1A and 1B are conceptual views showing the fundamental structure and operating principle of the liquid crystal optical element used in the optical system according to a first aspect in the present invention. FIG. 1A shows a state of action to which an incident ray is subjected where voltages are not applied to liquid crystal lenses and FIG. 1B shows a state of action to which the incident ray is subjected where the voltages are applied to the liquid crystal lenses.

A liquid crystal optical element 1 is provided with a first diffractive liquid crystal lens 11 and a second diffractive liquid crystal lens 12. Also, the first diffractive liquid crystal lens II and the second diffractive liquid crystal lens 12 are laminated between substrates 13a and 13b and between substrates 13b and 13c, respectively, and thereby the liquid crystal optical element 1 is integrally constructed.

Figure 16:
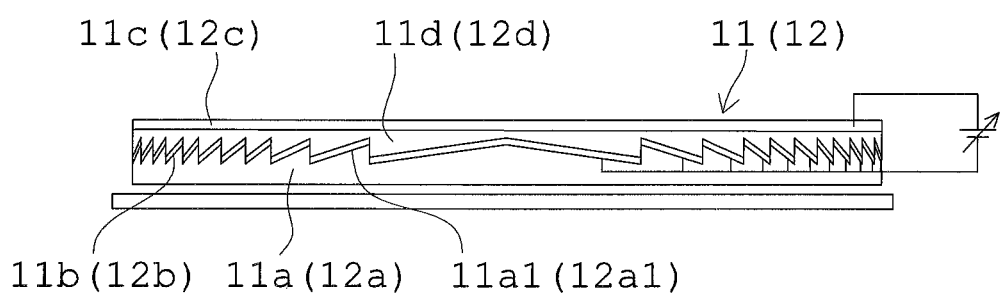
FIG. 16 is a sectional view showing an example of the structure of a diffractive liquid crystal lens applicable to the liquid crystal optical element according to the aspect.

Each of the first diffractive liquid crystal lens 11 and the second diffractive liquid crystal lens 12, for example, as shown in FIG. 16, comprises a liquid crystal 11d (12d) sandwiched between a thin film transparent electrode 11b (12b) and an opposite electrode 11c (12c) on a substrate 11a (12a) that has a preset saw-shaped relief 11a1 (12a1). A desired voltage is applied between the thin film transparent electrode 11b (12b) and the opposite electrode 11c (12c) through an electrode outgoing line and thereby the refractive index of the liquid crystal 11d (12d) is changed so that the phase distribution of the layer of the liquid crystal 11d (12d) is varied and the order of diffraction of the liquid crystal lens is altered.

In the liquid crystal optical element 1 of the aspect, the two diffractive liquid crystal lenses constructed as in the foregoing are used as the first diffractive liquid crystal lens 11 and the second diffractive liquid crystal lens 12 and are oppositely arranged so that mutual orientation directions cross at right angles in a plane perpendicular to the optical axis. Consequently, the polarization direction in which the first diffractive liquid crystal lens 11 has the ray deflecting action crosses at right angles with the polarization direction in which the second diffractive liquid crystal lens 12 has the ray deflecting action.

For example, when the voltage is applied to the liquid crystal 11d of the first diffractive liquid crystal lens 11 and thereby the first diffractive liquid crystal lens 11 has the ray deflecting action with respect to p-polarized (or s-polarized) incident light, the voltage is applied to the liquid crystal 12d of the second diffractive liquid crystal lens 12 and thereby the second diffractive liquid crystal lens 12 has the ray deflecting action with respect to s-polarized (or p-polarized) incident light. Also, the example of FIG. 1B is such that voltages are applied to the liquid crystals 11d and 12d and thereby the first diffractive liquid crystal lens 11 has the ray deflecting action relative to the p-polarized incident light, while the second diffractive liquid crystal lens 12 has the ray deflecting action relative to the s-polarized incident light. The liquid crystal optical element 1 is set so that refractive indices of substrates and ordinary indices of the liquid crystals 11d and 12d in the diffractive liquid crystal lenses 11 and 12 become equal.

The liquid crystal optical element 1 of the aspect constructed as mentioned above is actuated as described below.

First, when the voltage is applied to neither the liquid crystal 11d of the first diffractive liquid crystal lens 11 nor the liquid crystal 12d of the second diffractive liquid crystal lens 12, each of the liquid crystals 11d and 12d exerts the action of an ordinary index, irrespective of the polarization directions of an incident ray (namely, directions of p-polarized light and s-polarized light). The refractive indices of the substrates and the ordinary indices of the liquid crystals 11d and 12d in the diffractive liquid crystal lenses 11 and 12 are equal. Hence, the diffractive liquid crystal lenses 11 and 12 have no ray deflecting action, irrespective of the polarization directions of the incident ray, and act as plane-parallel plates. Specifically, the ray incident on the diffractive liquid crystal lenses 11 and 12 is subjected to the action of zero-order diffracted light in the diffractive liquid crystal lenses 11 and 12, irrespective of the polarization directions (directions of p-polarized light and s-polarized light).

In contrast to this, when the voltage is applied to the liquid crystal 11d of the first diffractive liquid crystal lens 11, the liquid crystal 11d exerts the action of an extraordinary index on the p-polarized light. Hence, the first diffractive liquid crystal lens 11 functions as a diffractive optical element that is blazed with respect to the p-polarized light. Consequently, the p-polarized light is subjected to the ray deflecting action as the first-order diffracted light. On the other hand, the liquid crystal 11d exerts the action of ordinary index distribution on the s-polarized light. Consequently, the first diffractive liquid crystal lens 11 acts as the plane-parallel plate with respect to the s-polarized light, and the s-polarized light is not subjected to the ray deflecting action.

When the voltage is applied to the liquid crystal 12d of the second diffractive liquid crystal lens 12, the liquid crystal 12d exerts the action of the extraordinary index on the s-polarized light. Hence, the second diffractive liquid crystal lens 12 functions as the diffractive optical element that is blazed with respect to the s-polarized light. Consequently, the s-polarized light is subjected to the ray deflecting action as the first-order diffracted light. On the other hand, the liquid crystal 12d exerts the action of ordinary index distribution on the p-polarized light. Consequently, the second diffractive liquid crystal lens 12 acts as the plane-parallel plate with respect to the p-polarized light, and the p-polarized light is not subjected to the ray deflecting action.

The optical system of the present invention is such that the liquid crystal optical element constructed like the liquid crystal optical element 1 of the aspect acts as the plane-parallel plate in focusing on the infinite object point. Hence, a light beam incident on the liquid crystal optical element is transmitted through the liquid crystal optical element without undergoing diffraction or refraction.

In the diffractive liquid crystal lens, as mentioned above, when diffraction efficiency is optimized with respect to a particular wavelength, the diffraction efficiency is impaired with other wavelengths. For example, when the diffractive liquid crystal lens is used in the imaging optical system of a camera utilizing white light in which a plurality of wavelengths are mixed, a great deal of unwanted order light is produced in accordance with the wavelength dependence of the diffraction efficiency and flare becomes liable to occur.

When the liquid crystal lens used in the liquid crystal optical element has a considerable manufacturing error, there is the possibility that the deterioration of performance of the ray deflection action of the liquid crystal lens due to the error comes into question.

However, when the liquid crystal lens is constructed to have no ray deflecting action with respect to a far object point as in the optical system of the present invention, the deterioration of performance relative to the far object point for which higher imaging performance than a near object point is required can be avoided.

In the optical system of the present invention, it is desirable that when the liquid crystal optical element constructed like the liquid crystal optical element 1 of the aspect has no ray deflecting action, focusing on the far object point is performed, while when the liquid crystal optical element has the ray deflecting action, focusing on the near object point is performed.

When voltages are applied to both the liquid crystal 11d and the liquid crystal 12d, incident light is such that, in the first diffractive liquid crystal lens 11, the p-polarized light is subjected to the ray deflecting action and is deflected in a preset direction from the optical axis, and the s-polarized light emerges without undergoing the ray deflecting action and is incident on the second diffractive liquid crystal lens 12. In the second diffractive liquid crystal lens 12, the s-polarized light is subjected to the ray deflecting action and is deflected in a preset direction from the optical axis, and the p-polarized light emerges, without undergoing the ray deflecting action, in a direction deflected through the first diffractive liquid crystal lens 11.

The ray incident on the liquid crystal optical element 1, therefore, is such that the p-polarized light is subjected to the ray deflecting action through the first diffractive liquid crystal lens 11, while the s-polarized light is subjected to the ray deflecting action through the second diffractive liquid crystal lens 12. Hence, the light is subjected to the ray deflecting action through either of the diffractive liquid crystal lenses, irrespective of the polarization directions relative to the p and s directions, and thus the loss of the amount of light is eliminated.

Since the liquid crystal optical element 1 of the aspect is constructed to use the diffractive liquid crystal lenses, and the thickness of the liquid crystal of each diffractive liquid crystal lens can be reduced. Therefore, the liquid crystal lens can be driven at low voltage and at high speed. Moreover, a spacing between the first diffractive liquid crystal lens 11 and the second diffractive liquid crystal lens 12 can be narrowed. As a result, as described later, when an arrangement is made such as to eliminate the shift of the imaging position between the p-polarized light deflected by undergoing the ray deflecting action through the first diffractive liquid crystal lens 11 and the s-polarized light deflected by undergoing the ray deflecting action through the second diffractive liquid crystal lens 12, it becomes easy to lessen the asymmetry of the image formation with respect to the p-polarized light and the s-polarized light.

Also, the first diffractive liquid crystal lens 11 and the second diffractive liquid crystal lens 12, as shown in FIGS. 1A and 1B, are integrally constructed as a lamination structure. This is favorable for holding. Also, these liquid crystal lenses may, of course, be separately provided.

In the example of FIG. 1B, the structure that the diffractive liquid crystal lenses have the action of the first-order diffracted light has been described, but the present invention is not limited to this structure and the structure for the action of second- or third-order diffracted light may be used.

Also, the liquid crystal optical element 1 of the aspect is constructed so that, as compared with the focal length of the first diffractive liquid crystal lens 11 with preset order light (for example, first-order light) relative to incident light (here, the p-polarized light) in one polarization direction, undergoing the ray deflecting action in the first diffractive liquid crystal lens 11, the focal length of the second diffractive liquid crystal lens 12 with the same order light relative to incident light (here, the s-polarized light) in the other polarization, undergoing the ray deflecting action direction in the second diffractive liquid crystal lens 12 is reduced.

As shown in FIGS. 1A and 1B, when the first diffractive liquid crystal lens 11 and the second diffractive liquid crystal lens 12 are laminated, the diffraction surface of the first diffractive liquid crystal lens 11 is spaced away from that of the second diffractive liquid crystal lens 12. Consequently, if the focal length of the first diffractive liquid crystal lens 11 is equal to that of the second diffractive liquid crystal lens 12, the light will be incident on the imaging plane in a state where one of the p-polarized light and the s-polarized light is in focus and the other is in out of focus, with the result that a double image is formed on the imaging plane.

Thus, in the liquid crystal optical element 1 of the aspect, the focal lengths of the first diffractive liquid crystal lens 11 and the second diffractive liquid crystal lens 12 are made to differ from each other so that the imaging positions (focal positions) of the same order light in the polarized light (here, the p-polarized light) undergoing the ray deflecting action in the first diffractive liquid crystal lens 11 and the polarized light (here, the s-polarized light) undergoing the ray deflecting action in the second diffractive liquid crystal lens 12 are practically coincide with each other. Specifically, it is constructed so that, in contrast with the focal length of the first diffractive liquid crystal lens 11 relative to the incident light in one polarization direction (here, the p-polarized light) in the first diffractive liquid crystal lens 11, the focal length of the second diffractive liquid crystal lens 12 with the same order light relative to the incident light in the other polarization direction (here, the s-polarized light) in the second diffractive liquid crystal lens 12 is reduced. In this way, the double image can be obviated.

Also, in this case, it is desirable to satisfy the following condition:

$$0 < |(f1-f2)/f1| \leq 0.5 \quad (1)$$

where f1 is the focal length of the first diffractive liquid crystal lens 11 and f2 is the focal length of the second diffractive liquid crystal lens 12.

Beyond the upper limit of Condition (1), the difference in the focal length between the first diffractive liquid crystal lens 11 and the second diffractive liquid crystal lens 12 becomes wide. Hence, the asymmetry of the image formation with respect to the polarized light undergoing the ray deflecting action in the first diffractive liquid crystal lens 11 and the second diffractive liquid crystal lens 12 becomes pronounced.

The following condition should be preferably satisfied:

$$0<|(f1-f2)/f1|\le 0.4 \quad (1')$$

where f1 is the focal length of the first diffractive liquid crystal lens 11 and f2 is the focal length of the second diffractive liquid crystal lens 12.

Further, the following condition should be preferably satisfied:

$$0<|(f1-f2)/f1|\le 0.3 \quad (1'')$$

where f1 is the focal length of the first diffractive liquid crystal lens 11 and f2 is the focal length of the second diffractive liquid crystal lens 12.

In the optical system of the present invention, it is desirable to satisfy the following condition:

$$|\Delta/f|\le 0.6 \quad (2)$$

where $\Delta$ is a spacing between the first diffractive liquid crystal lens 11 and the second diffractive liquid crystal lens 12 and f is the focal length of the optical system.

Beyond the upper limit of Condition (2), the asymmetry of the image formation of the polarized light undergoing the ray deflecting action in the first diffractive liquid crystal lens 11 and the second diffractive liquid crystal lens 12 becomes extremely pronounced.

Also, the following condition should be preferably satisfied:

$$0.0001\le|\Delta/f|\le 0.4 \quad (2')$$

where $\Delta$ is a spacing between the first diffractive liquid crystal lens 11 and the second diffractive liquid crystal lens 12 and f is the focal length of the optical system.

Further, the following condition should be preferably satisfied:

$$0.0001\le|\Delta/f|\le 0.2 \quad (2'')$$

where $\Delta$ is a spacing between the first diffractive liquid crystal lens 11 and the second diffractive liquid crystal lens 12 and f is the focal length of the optical system.

The image pick-up device includes the optical system of the present invention, an image sensor, and a zoom optical system.

In reference to the drawings, Embodiments 1-3 of the optical system of the present invention will be explained below. Optical path diagrams are shown in FIG. 2 to FIGS. 15A-15J.

Embodiment 1

Figure 3:
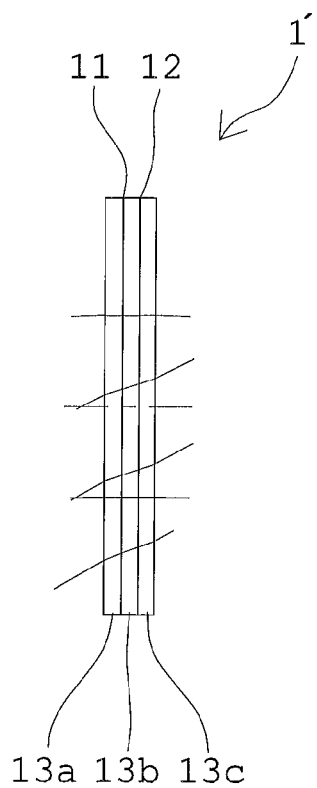
FIG. 3 is an explanatory view showing the structure of the liquid crystal optical element according to Embodiment 1.
Figure 4A:
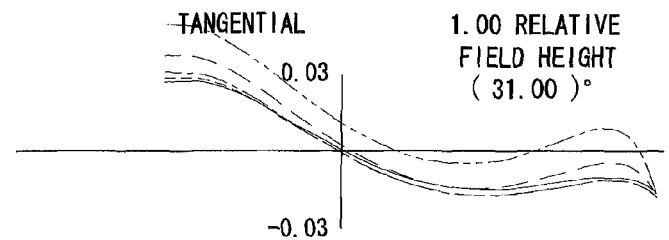
FIGS. 4A-4J are transverse aberration diagrams in focusing on the infinite object point in the optical system of Embodiment 1.
Figure 4B:
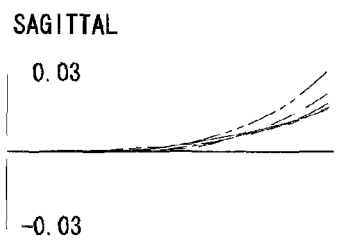
Figure 4C:
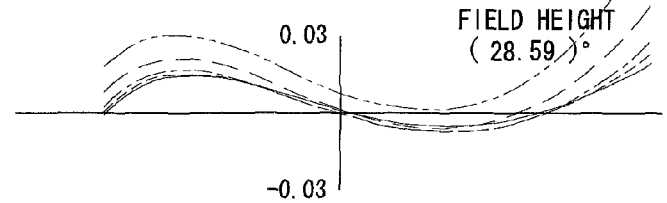
Figure 4D:
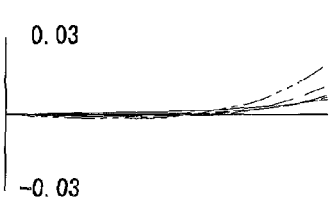
Figure 4E:
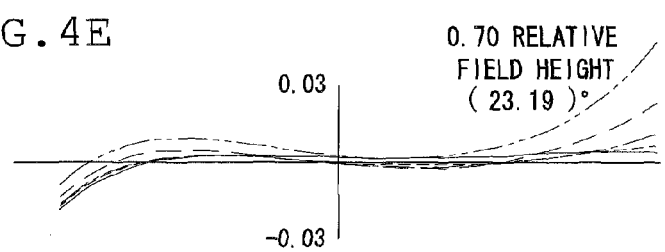
Figure 4F:
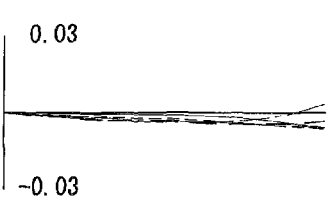
Figure 4G:
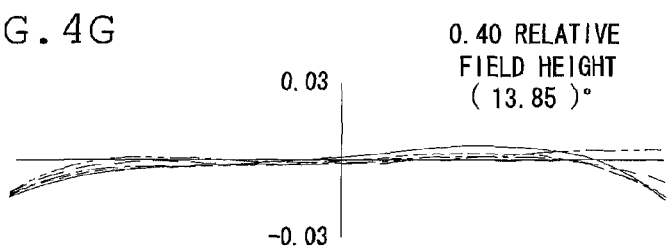
Figure 4H:
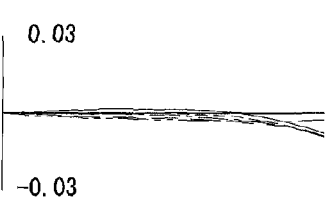
Figure 4I:
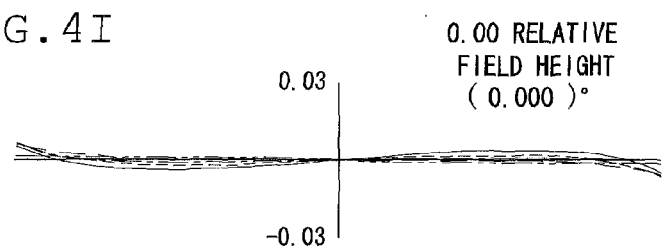
Figure 4J:
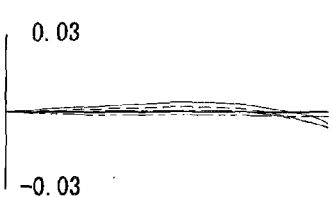

FIG. 2 is a sectional view showing the arrangement of the optical system, developed along the optical axis, in a state of focusing on an infinite object point, according to Embodiment 1, and FIG. 3 is an explanatory view showing the structure of the liquid crystal optical element according to Embodiment 1. FIGS. 4A-4J are transverse aberration diagrams in focusing on the infinite object point in the optical system of Embodiment 1. FIGS. 5A-5J are transverse aberration diagrams in focusing on a near point (in which only a liquid crystal lens for p-polarized light is actuated) in the optical system of Embodiment 1. FIGS. 6A-6J are transverse aberration diagrams in focusing on a near point (in which only a liquid crystal lens for s-polarized light is actuated) in the optical system of Embodiment 1.

The optical system of Embodiment 1, as shown in FIG. 2, includes, in order from the object side, a negative meniscus lens L1 with a convex surface facing the object side, a biconvex lens L2, a liquid crystal optical element 1', a cemented doublet of a biconcave lens L3 and a biconvex lens L4, a cemented doublet of a biconvex lens L5 and a biconcave lens L6, a positive meniscus lens L7 with a concave surface facing the object side, a plane-parallel plate P1, and a plane-parallel plate P2.

Also, in FIG. 2, subscripts of $r_1, r_2, \ldots$ and $d_1, d_2, \ldots$ in the lens sectional view correspond to numerals 1, 2, ... of face numbers in numerical data. Reference symbol S denotes an aperture stop and IM denotes the image pickup surface of an image sensor. In the numerical data described below, the refractive index and the Abbe's number indicate values at the d line (the same holds for other embodiments).

The liquid crystal optical element 1' has the same structure as the liquid crystal optical element 1 of the aspect shown in FIGS. 1A and 1B, and thus like reference numerals are used for like members, whose explanation is omitted. The liquid crystal optical element 1' is constructed to act as a plane-parallel plate in focusing on the infinite object point and to transmit an incident light beam without diffraction or refraction.

In the liquid crystal optical element 1', the first and second diffractive liquid crystal lenses 11 and 12 are constructed so that when voltages are not applied to the liquid crystals 11d and 12d, the action as zero-order light is exerted on incident light and focusing is performed on the infinite object point without the ray deflecting action. On the other hand, when the voltages are applied to them, the action as first-order light is exerted on the incident light and focusing is performed on an object point located 300 mm away from the foremost lens surface.

When the first and second diffractive liquid crystal lenses 11 and 12 are arranged in the proximity of the aperture stop S as in the optical system of Embodiment 1, the effective diameters of the first and second diffractive liquid crystal lenses 11 and 12 can be reduced.

When the diffractive liquid crystal lenses 11 and 12 used in the liquid crystal optical element 1' are arranged in the proximity of the aperture stop S as in the optical system of Embodiment 1, chromatic aberrations including longitudinal chromatic aberration caused by the fluctuation of the position of the object point can be effectively corrected. In this case, it is desirable to satisfy the following condition:

$$|y/sd|\le 0.8 \quad (3)$$

where y is the height of the most off-axis chief ray in the liquid crystal lens and sd is the effective radius of the liquid crystal lens.

It is also desirable to satisfy the following condition because the above function and effect become greater.

$$|y/sd|\le 0.7 \quad (3')$$

where y is the height of the most off-axis chief ray in the liquid crystal lens and sd is the effective radius of the liquid crystal lens.

It is further desirable to satisfy the following condition because the function and effect become much greater.

$$|y/sd|\le 0.6 \quad (3'')$$

where y is the height of the most off-axis chief ray in the liquid crystal lens and sd is the effective radius of the liquid crystal lens.

When a lens with positive refracting power and a lens with negative refracting power are arranged before and behind the liquid crystal optical element 1' provided with the liquid crystal lenses, chromatic aberration is easily corrected and thus this arrangement is favorable.

Subsequently, numerical data of optical members constituting the optical system of Embodiment 1 are shown.

Also, each of rotationally symmetrical aspherical surfaces described in the numerical data shown below is based on the definition of the following equation:

$$Z = ch^2 / \left[1 + \sqrt{\{1 - (1+k)c^2h^2\}}\right] + A4h^4 + A6h^6 + A8h^8 + A10h^{10} + \ldots$$

where c is a curvature at a vertex, k is a conic constant, A4 is a fourth-order aspherical coefficient, A6 is a sixth-order aspherical coefficient, A8 is an eighth-order aspherical coefficient, and A10 is a tenth-order aspherical coefficient. Also, h is a distance from the optical axis, where when a horizontal direction in a plane perpendicular to the optical axis is represented by x and a vertical direction is represented by y, $h^2 = x^2 + y^2$.

As a design technique of the diffractive liquid crystal lens shown as the numerical data below, the Sweatt method (an ultra-high index method) set forth in the following reference is used.

Reference: W. C. Sweatt, "Mathematical equivalence between a holographic optical element and an ultra-high index lens", J. Opt. Soc. Am, Vol. 69, No. 3 (1979).

In the numerical data listed below, the refractive index of the ultra-high index lens at a standard wavelength of 587.56 nm is taken as 588.56.

The refractive index (the ordinary index) of the liquid crystal where the voltage is off in the optical system of Embodiment 1 is 1.458467 and the Abbe's number is 65.0, while the refractive index (the extraordinary index) where the voltage is on is 1.708467, the Abbe's number is 30, and the thickness of the liquid crystal is 0.005 mm. These values are identical with those of the embodiments to be described later. Also, although, in the following, reference is made to numerical data of [1-1: Infinite object point], [1-2: Near point (for p-polarized light)], and [1-3: Near point (for s-polarized light)], the explanation of the data holds for other embodiments.

In the optical system of Embodiment 1, the liquid crystal lenses range from the fifth face to the twelfth face, and the layers of the liquid crystals are between the seventh face and the eighth face and between the tenth face and the eleventh face. Here, neither the diffraction surface (DOE [1]) of the liquid crystal lens for p-polarized light nor the diffraction surface (DOE [2]) of the liquid crystal lens for s-polarized light is actuated with respect to the infinite object point. Specifically, of the numerical data described below, the refractive index and Abbe's number (1.4585 and 65.0) of each liquid crystal, as shown in the numerical data of [1-1: Infinite object point], are identical with those (1.4585 and 65.0) of each diffraction surface. In addition, for the refractive index, any of the liquid crystal, the diffraction surface, and the substrate is 1.4585 and has the same value. Therefore, the diffraction surface is physically present, but fails to cause an optical action (the ray deflecting action).

Next, both the liquid crystal lens for p-polarized light and the liquid crystal lens for s-polarized light are actuated with respect to the near point. However, in the p-polarized light, only the liquid crystal lens for p-polarized light produces the deflection action, while in the s-polarized light, only the liquid crystal lens for s-polarized light produces the deflection action. Thus, for the near point, the numerical data of [1-2: Near point (for p-polarized light)] and [1-3: Near point (for s-polarized light)] are used.

The numerical data of [1-2: Near point (for p-polarized light)] are related to the p-polarized light. In the p-polarized light, the diffraction surface (DOE [1]) of the liquid crystal lens for p-polarized light causes the deflection action, while the diffraction surface (DOE [2]) of the liquid crystal lens for s-polarized light does not cause the deflection action. Thus, in the numerical data of [1-2: Near point (for p-polarized light)], the refractive index of the liquid crystal between the seventh face and the eighth face changes from 1.4585 to 1.7085. On the other hand, the refractive index of the liquid crystal between the tenth face and the eleventh face remains at 1.4585. By the fact that the refractive index of the liquid crystal between the seventh face and the eighth face changes to 1.7085, the diffraction surface (DOE [1]) of the liquid crystal lens for p-polarized light possesses the deflection action. In this way, the refractive index of the diffraction surface (DOE [1]) of the liquid crystal lens for p-polarized light also changes from 1.4585 to 588.56.

The numerical data of [1-3: Near point (for s-polarized light)] are related to the s-polarized light. In the s-polarized light, the diffraction surface (DOE [1]) of the liquid crystal lens for p-polarized light does not cause the deflection action, while the diffraction surface (DOE [2]) of the liquid crystal lens for s-polarized light causes the deflection action. Thus, in the numerical data of [1-3: Near point (for s-polarized light)], the refractive index of the liquid crystal between the seventh face and the eighth face remains at 1.4585. On the other hand, the refractive index of the liquid crystal between the tenth face and the eleventh face changes from 1.4585 to 1.7085. By the fact that the refractive index of the liquid crystal between the tenth face and the eleventh face changes to 1.7085, the diffraction surface (DOE [2]) of the liquid crystal lens for s-polarized light possesses the deflection action. In this way, the refractive index of the diffraction surface (DOE [2]) of the liquid crystal lens for s-polarized light also changes from 1.4585 to 588.56.

| Numerical data 1 (Embodiment 1) | | | | |
|---|---|---|---|---|
| [1-1: Infinite object point] Unit mm Surface data | | | | |
| Face number | Radius of curvature | Face spacing | Refractive index | Abbe's number |
| Object surface | ∞ | ∞ | | |
| 1 | 105.00 | 1.20 | 1.5182 | 58.9 |
| 2 | 5.09 | 1.24 | | |
| 3 | 38.32 | 1.50 | 1.7440 | 44.8 |
| 4 | −11.49 | 0.50 | | |
| 5 | ∞ | 0.30 | 1.4585 | 67.8 |
| 6 | ∞ | 0.00 | 1.4585 | 65.0 |

-continued

Numerical data 1 (Embodiment 1)

| | | | | |
|---|---|---|---|---|
| 7 (Diffraction surface) | −233418.48 (DOE [1]) | 0.005 | 1.4585 | 65.0 |
| 8 | ∞ | 0.30 | 1.4585 | 67.8 |
| 9 | ∞ | 0.00 | 1.4585 | 65.0 |
| 10 (Diffraction surface) | −237164.15 (DOE [2]) | 0.005 | 1.4585 | 65.0 |
| 11 | ∞ | 0.30 | 1.4585 | 67.8 |
| 12 | ∞ | 0.67 | | |
| 13 | −10.80 | 0.28 | 1.7620 | 40.1 |
| 14 | 4.90 | 1.20 | 1.7282 | 28.5 |
| 15 | −8.47 | 0.50 | | |
| 16 (Stop surface) | | 0.40 | | |
| 17 | 5.58 | 1.95 | 1.8160 | 46.6 |
| 18 | −4.08 | 0.01 | 1.5638 | 60.7 |
| 19 | −4.08 | 0.50 | 1.8052 | 25.4 |
| 20 | 4.08 | 1.87 | | |
| 21* | Aspherical surface [1] | 2.40 | 1.8061 | 40.9 |
| 22 | −5.66 | 4.13 | | |
| 23 | ∞ | 0.50 | 1.5163 | 64.1 |
| 24 | ∞ | 2.26 | | |
| 25 | ∞ | 0.50 | 1.5163 | 64.1 |
| 26 | ∞ | 0.49 | | |
| Image plane | ∞ | 0.00 | | |

Aspherical surface data

| Face number | 21st surface (Aspherical surface [1]) |
|---|---|
| Radius of curvature | −36.45 |

$k = 1.2194E{-}007$
$A4 = -7.9872E{-}004 \quad A6 = 1.0007E{-}004 \quad A8 = -8.1194E{-}006$
$A10 = 5.4486E{-}007$

[1-2: Near point (for p-polarized light)]
Unit mm
Surface data

| Face number | Radius of curvature | Face spacing | Refractive index | Abbe's number |
|---|---|---|---|---|
| Object surface | ∞ | 300.00 | | |
| 1 | 105.00 | 1.20 | 1.5182 | 58.9 |
| 2 | 5.09 | 1.24 | | |
| 3 | 38.32 | 1.50 | 1.7440 | 44.8 |
| 4 | −11.49 | 0.50 | | |
| 5 | ∞ | 0.30 | 1.4585 | 67.8 |
| 6 | ∞ | 0.00 | 588.5600 | −3.5 |
| 7 (Diffraction surface) | −233418.48 (DOE [1]) | 0.005 | 1.7085 | 30.0 |
| 8 | ∞ | 0.30 | 1.4585 | 67.8 |
| 9 | ∞ | 0.00 | 1.4585 | 65.0 |
| 10 (Diffraction surface) | −237164.15 (DOE [1]) | 0.005 | 1.4585 | 65.0 |
| 11 | ∞ | 0.30 | 1.4585 | 67.8 |
| 12 | ∞ | 0.67 | | |
| 13 | −10.80 | 0.28 | 1.7620 | 40.1 |
| 14 | 4.90 | 1.20 | 1.7282 | 28.5 |
| 15 | −8.47 | 0.50 | | |
| 16 (Stop surface) | | 0.40 | | |
| 17 | 5.58 | 1.95 | 1.8160 | 46.6 |
| 18 | −4.08 | 0.01 | 1.5638 | 60.7 |
| 19 | −4.08 | 0.50 | 1.8052 | 25.4 |
| 20 | 4.08 | 1.87 | | |
| 21* | Aspherical surface [1] | 2.40 | 1.8061 | 40.9 |
| 22 | −5.66 | 4.13 | | |
| 23 | ∞ | 0.50 | 1.5163 | 64.1 |
| 24 | ∞ | 2.26 | | |
| 25 | ∞ | 0.50 | 1.5163 | 64.1 |
| 26 | ∞ | 0.49 | | |
| Image plane | ∞ | 0.00 | | |

Diffraction surface data

| Face number | Seventh surface (DOE [1]) |
|---|---|
| Radius of curvature | −233418.48 |

$k = 0.0000E{+}000$
$A4 = -2.4691E{-}008 \quad A6 = 4.1725E{-}008 \quad A8 = -9.1727E{-}009$ -continued Numerical data 1 (Embodiment 1)

Aspherical data

| Face number | 21st surface (Aspherical surface [1]) |
|---|---|
| Radius of curvature | −36.45 | k = 1.2194E−007
A4 = −7.9872E−004     A6 = 1.0007E−004     A8 = −8.1194E−006
A10 = 5.4486E−007

[1-3: Near point (for s-polarized light)]
Unit mm
Surface data

| Face number | Radius of curvature | Face spacing | Refractive index | Abbe's number |
|---|---|---|---|---|
| Object surface | ∞ | 300.00 | | |
| 1 | 105.00 | 1.20 | 1.5182 | 58.9 |
| 2 | 5.09 | 1.24 | | |
| 3 | 38.32 | 1.50 | 1.7440 | 44.8 |
| 4 | −11.49 | 0.50 | | |
| 5 | ∞ | 0.30 | 1.4585 | 67.8 |
| 6 | ∞ | 0.00 | 1.4585 | 65.0 |
| 7 (Diffraction surface) | −233418.48 (DOE[1]) | 0.005 | 1.4585 | 65.0 |
| 8 | ∞ | 0.30 | 1.4585 | 67.8 |
| 9 | ∞ | 0.00 | 588.5600 | −3.5 |
| 10 (Diffraction surface) | −237164.15 (DOE[2]) | 0.005 | 1.7085 | 30.0 |
| 11 | ∞ | 0.30 | 1.4585 | 67.8 |
| 12 | ∞ | 0.67 | | |
| 13 | −10.80 | 0.28 | 1.7620 | 40.1 |
| 14 | 4.90 | 1.20 | 1.7282 | 28.5 |
| 15 | −8.47 | 0.50 | | |
| 16 (Stop surface) | | 0.40 | | |
| 17 | 5.58 | 1.95 | 1.8160 | 46.6 |
| 18 | −4.08 | 0.01 | 1.5638 | 60.7 |
| 19 | −4.08 | 0.50 | 1.8052 | 25.4 |
| 20 | 4.08 | 1.87 | | |
| 21* | Aspherical surface [1] | 2.40 | 1.8061 | 40.9 |
| 22 | −5.66 | 4.13 | | |
| 23 | ∞ | 0.50 | 1.5163 | 64.1 |
| 24 | ∞ | 2.26 | | |
| 25 | ∞ | 0.50 | 1.5163 | 64.1 |
| 26 | ∞ | 0.49 | | |
| Image plane | ∞ | 0.00 | | |

Diffraction surface data

| Face number | Tenth surface (DOE [2]) |
|---|---|
| Radius of curvature | −237164.15 | k = 0.0000E+000
A4 = −8.7050E−008     A6 = 7.4874E−008     A8 = −1.4487E−008

Aspherical surface data

| Face number | 21st surface (Aspherical surface [1]) |
|---|---|
| Radius of curvature | −36.45 | k = 1.2194E−007
A4 = −7.9872E−004     A6 = 1.0007E−004     A8 = −8.1194E−006
A10 = 5.4486E−007

Embodiment 2

Figure 7:
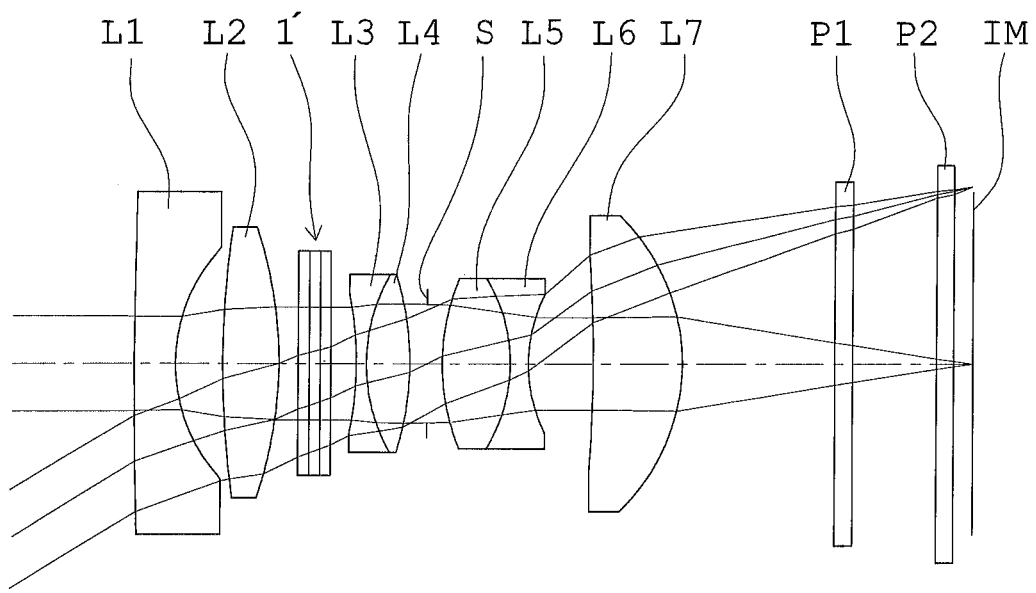
FIG. 7 is a sectional view showing the arrangement of the optical system, developed along the optical axis, in a state of focusing on an infinite object point, according to Embodiment 2.
Figure 9A:
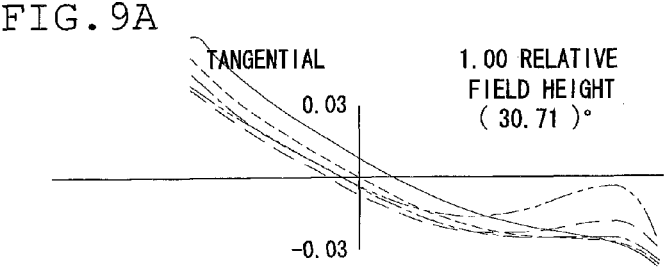
FIGS. 9A-9J are transverse aberration diagrams in focusing on a near point (in which only a liquid crystal lens for p-polarized light is actuated) in the optical system of Embodiment 2.
Figure 9B:
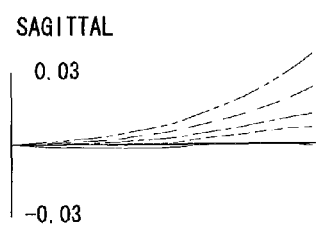
Figure 9C:
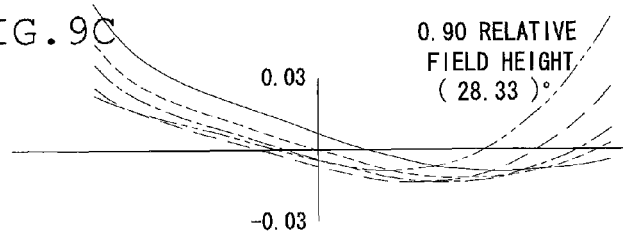
Figure 9D:
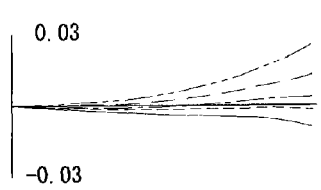
Figure 9E:
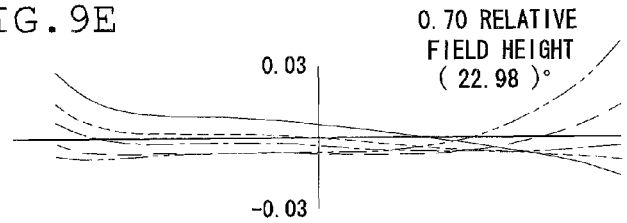
Figure 9F:
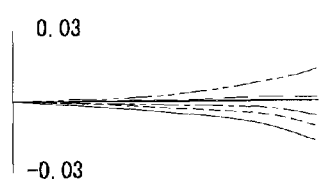
Figure 9G:
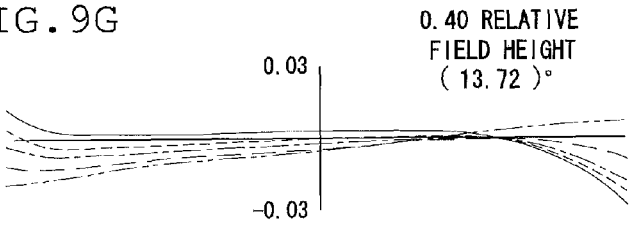
Figure 9H:
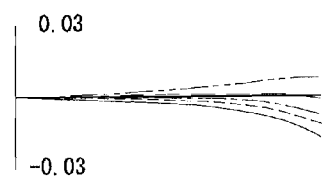
Figure 9I:
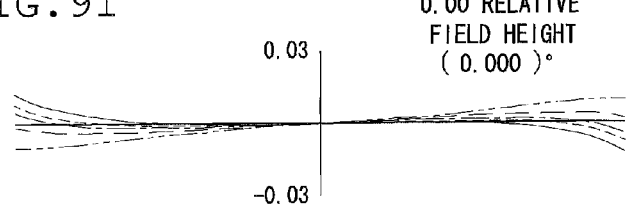
Figure 9J:
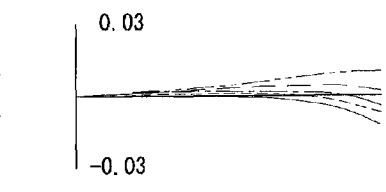

FIG. 7 is a sectional view showing the arrangement of the optical system, developed along the optical axis, in a state of focusing on an infinite object point, according to Embodiment 2, FIGS. 8A-8J are transverse aberration diagrams in focusing on the infinite object point in the optical system of Embodiment 2, FIGS. 9A-9J are transverse aberration diagrams in focusing on a near point (in which only a liquid crystal lens for p-polarized light is actuated) in the optical system of Embodiment 2, and FIGS. 10A-10J are transverse aberration diagrams in focusing on a near point (in which only a liquid crystal lens for s-polarized light is actuated) in the optical system of Embodiment 2.

The optical system of Embodiment 2 has the same arrangement as the optical system of Embodiment 1 with the exception of only the structures of the diffractive liquid crystal lenses used as the first diffractive liquid crystal lens 11 and the second diffractive liquid crystal lens 12 in the liquid crystal optical element 1'. The liquid crystal optical element 1' is constructed to act as a plane-parallel plate in focusing on the infinite object point and to transmit an incident light beam without diffraction or refraction.

In the liquid crystal optical element 1', the first and second diffractive liquid crystal lenses 11 and 12 are constructed so that when voltages are not applied to the liquid crystals 11$d$ and 12$d$, the action as zero-order light is exerted on incident light and the light is brought to a focus on the infinite object point without having the ray deflecting action. On the other hand, when the voltages are applied to them, the action as first-order light is exerted on the incident light and focusing is performed on an object point located 200 mm away from the foremost lens surface. Other features are almost the same as in the optical system of Embodiment 1.

The liquid crystal optical element 1' of Embodiment 2, in contrast with the liquid crystal optical element of Embodiment 3 described later, is such that the diffractive liquid crystal lenses are located at a position where the power of the diffractive liquid crystal lenses for focusing on the same near point position (200 mm) can be lessened and thus the fabrication of the diffractive liquid crystal lenses is facilitated.

Subsequently, numerical data of optical members constituting the optical system provided with the liquid crystal optical element 1' of Embodiment 2 are shown. In the optical system of Embodiment 2, like the optical system of Embodiment 1, the liquid crystal lenses range from the fifth face to the twelfth face, and the layers of the liquid crystals are between the seventh face and the eighth face and between the tenth face and the eleventh face.

Numerical data 2 (Embodiment 2)

[2-1: Infinite object point]
Unit mm
Surface data

| Face number | Radius of curvature | Face spacing | Refractive index | Abbe's number |
|---|---|---|---|---|
| Object surface | ∞ | ∞ | | |
| 1 | 105.00 | 1.20 | 1.5182 | 58.9 |
| 2 | 5.09 | 1.24 | | |
| 3 | 38.32 | 1.50 | 1.7440 | 44.8 |
| 4 | −11.49 | 0.50 | | |
| 5 | ∞ | 0.30 | 1.4585 | 67.8 |
| 6 | ∞ | 0.00 | 1.4585 | 65.0 |
| 7 (Diffraction surface) | −158686.60 (DOE[3]) | 0.005 | 1.4585 | 65.0 |
| 8 | ∞ | 0.30 | 1.4585 | 67.8 |
| 9 | ∞ | 0.00 | 1.4585 | 65.0 |
| 10 (Diffraction surface) | −161088.47 (DOE [4]) | 0.005 | 1.4585 | 65.0 |
| 11 | ∞ | 0.30 | 1.4585 | 67.8 |
| 12 | ∞ | 0.67 | | |
| 13 | −10.80 | 0.28 | 1.7620 | 40.1 |
| 14 | 4.90 | 1.20 | 1.7282 | 28.5 |
| 15 | −8.47 | 0.50 | | |
| 16 (Stop surface) | | 0.40 | | |
| 17 | 5.58 | 1.95 | 1.8160 | 46.6 |
| 18 | −4.08 | 0.01 | 1.5638 | 60.7 |
| 19 | −4.08 | 0.50 | 1.8052 | 25.4 |
| 20 | 4.08 | 1.87 | | |
| 21* | Aspherical surface [2] | 2.40 | 1.8061 | 40.9 |
| 22 | −5.66 | 4.13 | | |
| 23 | ∞ | 0.50 | 1.5163 | 64.1 |
| 24 | ∞ | 2.26 | | |
| 25 | ∞ | 0.50 | 1.5163 | 64.1 |
| 26 | ∞ | 0.49 | | |
| Image plane | ∞ | 0.00 | | |

Aspherical surface data

| Face number | 21st surface (Aspherical surface [2]) |
|---|---|
| Radius of curvature | −36.45 | k = 1.2194E−007
A4 = −7.9872E−004    A6 = 1.0007E−004    A8 = −8.1194E−006
A10 = 5.4486E−007

[2-2: Near point (for p-polarized light)]
Unit mm
Surface data

| Face number | Radius of curvature | Face spacing | Refractive index | Abbe's number |
|---|---|---|---|---|
| Object surface | ∞ | 200.00 | | |
| 1 | 105.00 | 1.20 | 1.5182 | 58.9 |
| 2 | 5.09 | 1.24 | | |
| 3 | 38.32 | 1.50 | 1.7440 | 44.8 |
| 4 | −11.49 | 0.50 | | |
| 5 | ∞ | 0.30 | 1.4585 | 67.8 |
| 6 | ∞ | 0.00 | 588.5600 | −3.5 |
| 7 (Diffraction surface) | −158686.60(DOE[3]) | 0.005 | 1.7085 | 30.0 |
| 8 | ∞ | 0.30 | 1.4585 | 67.8 |
| 9 | ∞ | 0.00 | 1.4585 | 65.0 |
| 10 (Diffraction surface) | −161088.47(DOE[4]) | 0.005 | 1.4585 | 65.0 |
| 11 | ∞ | 0.30 | 1.4585 | 67.8 |

-continued

Numerical data 2 (Embodiment 2)

| 12 | ∞ | 0.67 | | |
|---|---|---|---|---|
| 13 | −10.80 | 0.28 | 1.7620 | 40.1 |
| 14 | 4.90 | 1.20 | 1.7282 | 28.5 |
| 15 | −8.47 | 0.50 | | |
| 16 (Stop surface) | | 0.40 | | |
| 17 | 5.58 | 1.95 | 1.8160 | 46.6 |
| 18 | −4.08 | 0.01 | 1.5638 | 60.7 |
| 19 | −4.08 | 0.50 | 1.8052 | 25.4 |
| 20 | 4.08 | 1.87 | | |
| 21* | Aspherical surface[2] | 2.40 | 1.8061 | 40.9 |
| 22 | −5.66 | 4.13 | | |
| 23 | ∞ | 0.50 | 1.5163 | 64.1 |
| 24 | ∞ | 2.26 | | |
| 25 | ∞ | 0.50 | 1.5163 | 64.1 |
| 26 | ∞ | 0.49 | | |
| Image plane | ∞ | 0.00 | | |

Diffraction surface data

| Face number | Seventh surface (DOE[3]) |
|---|---|
| Radius of curvature | −158686.60 |

$k = 0.0000E+000$
$A4 = -2.6651E-008$  $A6 = 3.2511E-008$  $A8 = -7.9738E-009$

Aspherical surface data

| Face number | 21st (Aspherical surface [2]) |
|---|---|
| Radius of curvature | −36.45 |

$k = 1.2194E-007$
$A4 = -7.9872E-004$  $A6 = 1.0007E-004$  $A8 = -8.1194E-006$
$A10 = 5.4486E-007$

[2-3: Near point (for s-polarized light)
Unit mm
Surface data

| Face number | Radius of curvature | Face spacing | Refractive index | Abbe's number |
|---|---|---|---|---|
| Object surface | ∞ | 200.00 | | |
| 1 | 105.00 | 1.20 | 1.5182 | 58.9 |
| 2 | 5.09 | 1.24 | | |
| 3 | 38.32 | 1.50 | 1.7440 | 44.8 |
| 4 | −11.49 | 0.50 | | |
| 5 | ∞ | 0.30 | 1.4585 | 67.8 |
| 6 | ∞ | 0.00 | 1.4585 | 65.0 |
| 7 (Diffraction surface) | −158686.60 (DOE [3]) | 0.005 | 1.4585 | 65.0 |
| 8 | ∞ | 0.30 | 1.4585 | 67.8 |
| 9 | ∞ | 0.00 | 588.5600 | −3.5 |
| 10 (Diffraction surface) | −161088.47 (DOE [4]) | 0.005 | 1.7085 | 30.0 |
| 11 | ∞ | 0.30 | 1.4585 | 67.8 |
| 12 | ∞ | 0.67 | | |
| 13 | −10.80 | 0.28 | 1.7620 | 40.1 |
| 14 | 4.90 | 1.20 | 1.7282 | 28.5 |
| 15 | −8.47 | 0.50 | | |
| 16 (Stop surface) | | 0.40 | | |
| 17 | 5.58 | 1.95 | 1.8160 | 46.6 |
| 18 | −4.08 | 0.01 | 1.5638 | 60.7 |
| 19 | −4.08 | 0.50 | 1.8052 | 25.4 |
| 20 | 4.08 | 1.87 | | |
| 21* | Aspherical surface [2] | 2.40 | 1.8061 | 40.9 |
| 22 | −5.66 | 4.13 | | |
| 23 | ∞ | 0.50 | 1.5163 | 64.1 |
| 24 | ∞ | 2.26 | | |
| 25 | ∞ | 0.50 | 1.5163 | 64.1 |
| 26 | ∞ | 0.49 | | |
| Image plane | ∞ | 0.00 | | |

Diffraction surface data

| Face number | Tenth surface (DOE [4]) |
|---|---|
| Radius of curvature | −161088.47 |

$k = 0.0000E+000$
$A4 = -1.0564E-007$  $A6 = 7.1812E-008$  $A8 = -1.3925E-008$

-continued

Numerical data 2 (Embodiment 2)

Aspherical surface data

| Face number | 21st surface (Aspherical surface [2]) |
|---|---|
| Radius of curvature | −36.45 |

| k = 1.2194E−007 | | |
|---|---|---|
| A4 = −7.9872E−004 | A6 = 1.0007E−004 | A8 = −8.1194E−006 |
| A10 = 5.4486E−007 | | |

Embodiment 3

Figure 11:
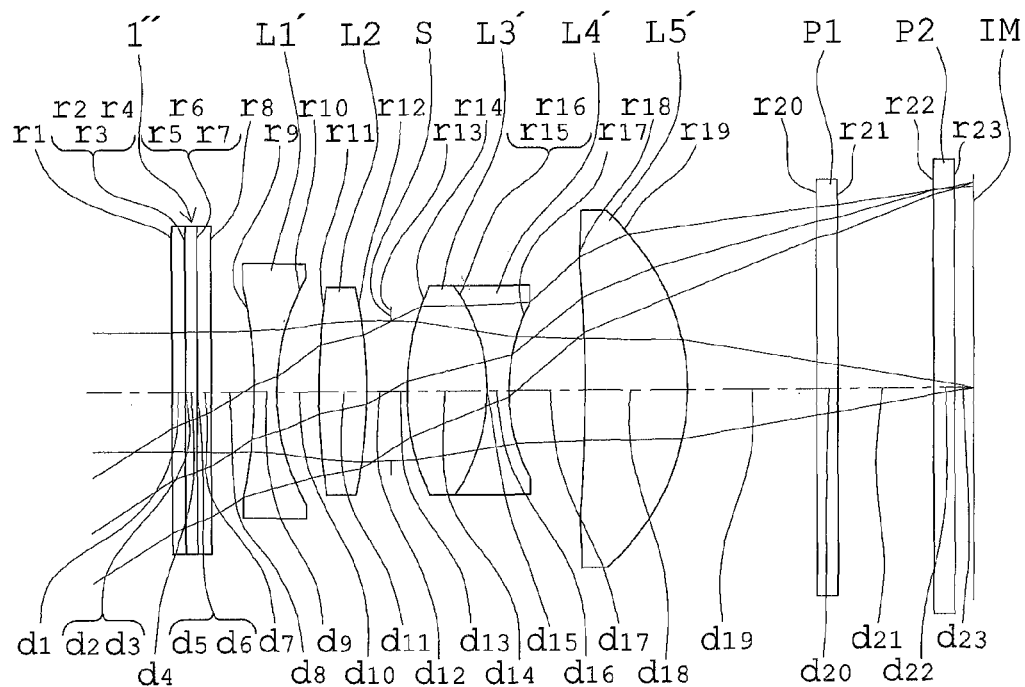
FIG. 11 is a sectional view showing the arrangement of the optical system, developed along the optical axis, in a state of focusing on an infinite object point, according to Embodiment 3.
Figure 12:
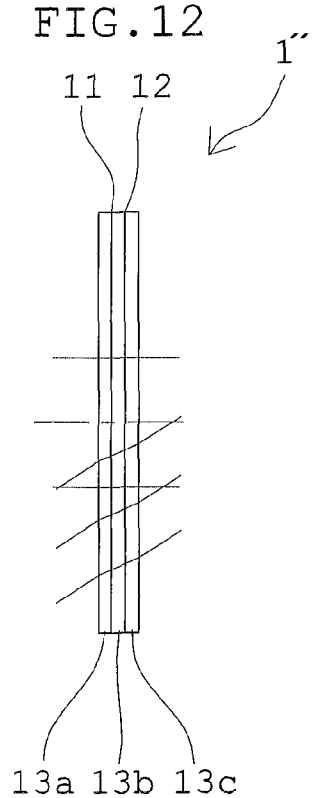
FIG. 12 is an explanatory view showing the structure of the liquid crystal optical element according to Embodiment 3.

FIG. 11 is a sectional view showing the arrangement of the optical system, developed along the optical axis, in a state of focusing on an infinite object point, according to Embodiment 3 and FIG. 12 is an explanatory view showing the structure of the liquid crystal is optical element according to Embodiment 3. FIGS. 13A-13J are transverse aberration diagrams in focusing on the infinite object point in the optical system of Embodiment 3, FIGS. 14A-14J are transverse aberration diagrams in focusing on a near point (in which only a liquid crystal lens for p-polarized light is actuated) in the optical system of Embodiment 3, and FIGS. 15A-15J are transverse aberration diagrams in focusing on a near point (in which only a liquid crystal lens for s-polarized light is actuated) in the optical system of Embodiment 3.

The optical system of Embodiment 3 is constructed so that the liquid crystal lenses are located at the most object-side position of the imaging optical system. Specifically, the optical system includes, in order form the object side, a liquid crystal optical element 1", a biconcave lens L1', the biconvex lens L2, a cemented doublet of a biconvex lens L3' and a biconcave lens L4', a positive meniscus lens L5' with a concave surface facing the object side, the plane-parallel plate P1, and the plane-parallel plate P2. Also, in FIG. 11, reference symbol S denotes the aperture stop and IM denotes the image pickup surface of the image sensor.

The liquid crystal optical element 1" has the same structure as the liquid crystal optical element 1 of the aspect shown in FIGS. 1A and 1B, and hence like references are used for like members, whose explanation is omitted. The liquid crystal optical element 1" is constructed to act as a plane-parallel plate in focusing on the infinite object point and to transmit an incident light beam without diffraction or refraction.

In the liquid crystal optical element 1', the first and second diffractive liquid crystal lenses 11 and 12 are constructed so that when voltages are not applied to the liquid crystals 11$d$ and 12$d$, the action as zero-order light is exerted on incident light and the light is brought to a focus on the infinite object point without having the ray deflecting action. On the other hand, when the voltages are applied to them, the action as first-order light is exerted on the incident light and focusing is performed on an object point located 200 mm away from the foremost lens surface. Other features of the liquid crystal optical element 1" are almost the same as in the liquid crystal optical element 1' of each of Embodiments 1 and 2.

According to the optical system of Embodiment 3, when the focal length of the liquid crystal lenses is 204 mm, focusing is performed on a near point of 2.00 mm. Consequently, the power of the liquid crystal lenses becomes stronger than in the optical system of each of Embodiments 1 and 2, but the liquid crystal lenses are located at the top of the lens system and thus this is favorable for processing of wiring of the liquid crystal lenses and for a mechanical mechanism.

Subsequently, numerical data of optical members constituting the optical system provided with the liquid crystal optical element 1" of Embodiment 3 are shown. In the optical system of Embodiment 3, the liquid crystal lenses range from the first face to the eighth face, and the layers of the liquid crystals are between the third face and the fourth face and between the sixth face and the seventh face.

Numerical data 3 (Embodiment 3)

[3-1: Infinite object point]
Unit mm
Surface data

| Face number | Radius of curvature | Face spacing | Refractive index | Abbe's number |
|---|---|---|---|---|
| Object surface | ∞ | ∞ | | |
| 1 | ∞ | 0.30 | 1.4585 | 67.8 |
| 2 | ∞ | 0.00 | 1.4585 | 65.0 |
| 3 (Diffraction surface) | −119457.53 (DOE [5]) | 0.005 | 1.4585 | 65.0 |
| 4 | ∞ | 0.30 | 1.4585 | 67.8 |
| 5 | ∞ | 0.00 | 1.4585 | 65.0 |
| 6 (Diffraction surface) | −119939.41 (DOE [6]) | 0.005 | 1.4585 | 65.0 |
| 7 | ∞ | 0.30 | 1.4585 | 67.8 |
| 8 | ∞ | 1.00 | | |
| 9 | −13.34 | 0.55 | 1.5163 | 64.1 |
| 10 | 5.74 | 0.99 | | |
| 11 | 17.40 | 1.12 | 2.0033 | 28.3 |
| 12 | −12.42 | 0.60 | | |
| 13 (Stop surface) | | 0.40 | | |
| 14 | 5.58 | 1.95 | 1.8160 | 46.6 |
| 15 | −4.08 | 0.01 | 1.5638 | 60.7 |
| 16 | −4.08 | 0.50 | 1.8052 | 25.4 |
| 17 | 4.08 | 1.87 | | |

-continued

| | Numerical data 3 (Embodiment 3) | | | |
|---|---|---|---|---|
| 18* | Aspherical surface [3] | 2.40 | 1.8061 | 40.9 |
| 19 | −5.66 | 3.05 | | |
| 20 | ∞ | 0.50 | 1.5163 | 64.1 |
| 21 | ∞ | 2.26 | | |
| 22 | ∞ | 0.50 | 1.5163 | 64.1 |
| 23 | ∞ | 0.48 | | |
| Image plane | ∞ | 0.00 | | |

Aspherical surface data

| Face number | 18th surface (Aspherical surface [3]) |
|---|---|
| Radius of curvature | −36.45 | k = 1.2194E−007
A4 = −7.9872E−004    A6 = 1.0007E−004    A8 = −8.1194E−006
A10 = 5.4486E−007

[3-2: Near point (for p-polarized light)
Unit mm
Surface data

| Face number | Radius of curvature | Face spacing | Refractive index | Abbe's number |
|---|---|---|---|---|
| Object surface | ∞ | 200.00 | | |
| 1 | ∞ | 0.30 | 1.4585 | 67.8 |
| 2 | ∞ | 0.00 | 588.5600 | −3.5 |
| 3 (Diffraction surface) | −119457.53 (DOE [5]) | 0.005 | 1.7085 | 30.0 |
| 4 | ∞ | 0.30 | 1.4585 | 67.8 |
| 5 | ∞ | 0.00 | 1.4585 | 65.0 |
| 6 (Diffraction surface) | −119939.41 (DOE [6]) | 0.005 | 1.4585 | 65.0 |
| 7 | ∞ | 0.30 | 1.4585 | 67.8 |
| 8 | ∞ | 1.00 | | |
| 9 | −13.34 | 0.55 | 1.5163 | 64.1 |
| 10 | 5.74 | 0.99 | | |
| 11 | 17.40 | 1.12 | 2.0033 | 28.3 |
| 12 | −12.42 | 0.60 | | |
| 13 (Stop surface) | | 0.40 | | |
| 14 | 5.58 | 1.95 | 1.8160 | 46.6 |
| 15 | −4.08 | 0.01 | 1.5638 | 60.7 |
| 16 | −4.08 | 0.50 | 1.8052 | 25.4 |
| 17 | 4.08 | 1.87 | | |
| 18* | Aspherical surface [3] | 2.40 | 18061 | 40.9 |
| 19 | −5.66 | 3.05 | | |
| 20 | ∞ | 0.50 | 1.5163 | 64.1 |
| 21 | ∞ | 2.26 | | |
| 22 | ∞ | 0.50 | 1.5163 | 64.1 |
| 23 | ∞ | 0.48 | | |
| Image plane | ∞ | 0.00 | | |

Diffraction surface data

| Face number | Third surface (DOE [5]) |
|---|---|
| Radius of curvature | −119457.53 | k = 0.0000E+000
A4 = 6.2474E−008    A6 = −4.9008E−009

Aspherical surface data

| Face number | 18th surface (Aspherical surface [3]) |
|---|---|
| Radius of curvature | −36.45 | k = 1.2194E−007
A4 = −7.9872E−004    A6 = 1.0007E−004    A8 = −8.1194E−006
A10 = 5.4486E−007

[3-3: Near point (for s-polarized light)]
Unit mm
Surface data

| Face number | Radius of curvature | Face spacing | Refractive index | Abbe's number |
|---|---|---|---|---|
| Object surface | ∞ | 200.00 | | |
| 1 | ∞ | 0.30 | 1.4585 | 67.8 |
| 2 | ∞ | 0.00 | 1.4585 | 65.0 |
| 3 (Diffraction surface) | −119457.53 (DOE [5]) | 0.005 | 1.4585 | 65.0 |
| 4 | ∞ | 0.30 | 1.4585 | 67.8 |
| 5 | ∞ | 0.00 | 588.5600 | −3.5 |

-continued

| Numerical data 3 (Embodiment 3) | | | | |
|---|---|---|---|---|
| 6 (Diffraction surface) | −119939.41 (DOE [6]) | 0.005 | 1.7085 | 30.0 |
| 7 | ∞ | 0.30 | 1.4585 | 67.8 |
| 8 | ∞ | 1.00 | | |
| 9 | −13.34 | 0.55 | 1.5163 | 64.1 |
| 10 | 5.74 | 0.99 | | |
| 11 | 17.40 | 1.12 | 2.0033 | 28.3 |
| 12 | −12.42 | 0.60 | | |
| 13 (Stop surface) | | 0.40 | | |
| 14 | 5.58 | 1.95 | 1.8160 | 46.6 |
| 15 | −4.08 | 0.01 | 1.5638 | 60.7 |
| 16 | −4.08 | 0.50 | 1.8052 | 25.4 |
| 17 | 4.08 | 1.87 | | |
| 18* | Aspherical surface [3] | 2.40 | 1.8061 | 40.9 |
| 19 | −5.66 | 3.05 | | |
| 20 | ∞ | 0.50 | 1.5163 | 64.1 |
| 21 | ∞ | 2.26 | | |
| 22 | ∞ | 0.50 | 1.5163 | 64.1 |
| 23 | ∞ | 0.48 | | |
| Image plane | ∞ | 0.00 | | |

| Diffraction surface data | |
|---|---|
| Face number | Sixth surface (DOE [6]) |
| Radius of curvature | −119939.41 |

$k = 0.0000E+000$
$A4 = 5.4913E-008$    $A6 = -4.5332E-009$

| Aspherical surface data | |
|---|---|
| Face number | 18th surface (Aspherical surface [3]) |
| Radius of curvature | −36.45 |

$k = 1.2194E-007$
$A4 = -7.9872E-004$    $A6 = 1.0007E-004$    $A8 = -8.1194E-006$
$A10 = 5.4486E-007$

Subsequently, values corresponding to parameters of the conditions in the optical systems of Embodiments 1-3 and various data of the optical systems are listed in Tables 1 and 2.

TABLE 1

| Condition | Embodiment 1 | Embodiment 2 | Embodiment 3 |
|---|---|---|---|
| Condition (1) | | | |
| $|(f1 - f2)/f1|$ | 0.0160 | 0.0151 | 0.0040 |
| f1 | 397.7 | 270.4 | 203.6 |
| f2 | 404.1 | 274.5 | 204.4 |
| Condition (2) | | | |
| Δ/f | 0.0380 | 0.0380 | 0.0377 |
| Δ | 0.3 | 0.3 | 0.3 |
| f | 7.900 | 7.900 | 7.962 |
| Condition (3) | | | |
| For p-polarized light, Far point | | | |
| $|y/sd|$ | 0.538 | 0.538 | 0.623 |
| y | 1.158 | 1.158 | 2.022 |
| sd | 2.150 | 2.150 | 3.244 |
| For p-polarized light, Near point | | | |
| $|y/sd|$ | 0.537 | 0.537 | 0.623 |
| y | 1.158 | 1.158 | 2.022 |
| sd | 2.156 | 2.157 | 3.243 |
| For s-polarized light, Far point | | | |
| $|y/sd|$ | 0.504 | 0.504 | 0.609 |
| y | 1.056 | 1.056 | 1.902 |
| sd | 2.096 | 2.096 | 3.123 |
| For s-polarized light, Near point | | | |
| $|y/sd|$ | 0.502 | 0.502 | 0.609 |
| y | 1.055 | 1.055 | 1.901 |
| sd | 2.102 | 2.103 | 3.123 |

TABLE 2

| | Embodiment 1 | | | Embodiment 2 | | | Embodiment 3 | | |
|---|---|---|---|---|---|---|---|---|---|
| | Far point | Near point, p-polarized light | Near point, s-polarized light | Far point | Near point, p-polarized light | Near point, s-polarized light | Far point | Near point, p-polarized light | Near point, s-polarized light |
| Focal length | 7.900 | 7.855 | 7.852 | 7.900 | 7.834 | 7.829 | 7.962 | 7.958 | 7.950 |
| Fno | 3.045 | 3.044 | 3.044 | 3.045 | 3.044 | 3.044 | 2.840 | 2.840 | 2.840 |
| Field angle | 31.00 | 31.00 | 30.81 | 31.00 | 30.69 | 30.71 | 32.39 | 31.73 | 31.76 |

TABLE 2-continued

|  | Embodiment 1 | | | Embodiment 2 | | | Embodiment 3 | | |
| --- | --- | --- | --- | --- | --- | --- | --- | --- | --- |
|  | Far point | Near point, p-polarized light | Near point, s-polarized light | Far point | Near point, p-polarized light | Near point, s-polarized light | Far point | Near point, p-polarized light | Near point, s-polarized light |
| Image height | 4.869 | 4.869 | 4.869 | 4.869 | 4.869 | 4.869 | 4.869 | 4.869 | 4.869 |
| Overall lens length | 24.05 | 24.04 | 24.04 | 24.05 | 24.04 | 24.04 | 19.10 | 19.10 | 19.10 |
| BF | 0.5234 | 0.5106 | 0.5140 | 0.5234 | 0.5084 | 0.5132 | 0.4822 | 0.4874 | 0.4884 |

Also, the overall lens length refers to a distance from the foremost lens surface to a paraxial image plane and BF denotes a distance from the last lens surface to the paraxial image plane.

Although the imaging optical system of the present invention has been described on the basis of the embodiments, the present invention is not limited to these embodiments and various modifications are possible.

According to the present invention, the optical system in which high imaging performance can be realized in focusing on either the near point or the far point, and the image pick-up device provided with this optical system are obtained.

The present invention is useful for the field in which it is necessary to use the image pick-up device which is compact and allows rapid focusing.

What is claimed is:

1. An optical system comprising:
   at least one lens;
   a liquid crystal optical element comprising a first diffractive liquid crystal lens and a second diffractive liquid crystal lens that are arranged to oppose each other with orientation directions thereof being perpendicular to each other in a plane perpendicular to an optical axis and
   a control portion that adjusts a voltage applied to the liquid crystal optical element for compensating for a shift of a focal position relative to incident light from a different object point; wherein the optical system is configured so that a far object point is in focus in a state where the liquid crystal optical element is made to fail to have a ray deflecting action by the control portion and so that a near object point is in focus in a state where the liquid crystal optical element is made to have the ray deflecting action by the control portion, and
   wherein the optical system satisfies the following condition:

$|y/sd| \leq 0.6$ where y is a height of a most off-axis chief ray in the liquid crystal optical element and sd is an effective radius of the liquid crystal optical element.

2. An optical system according to claim 1, wherein each of the first diffractive liquid crystal lens and the second diffractive liquid crystal lens is a Fresnel liquid crystal lens.

3. An image pick-up device having the optical system stated in claim 2, an image sensor, and a zoom optical system.

4. An optical system according to claim 1, satisfying the following condition:

$0 < |(f1-f2)/f1| \leq 0.5$ where f1 is a focal length of the first diffractive liquid crystal lens with preset order light relative to incident light that has a first polarization direction and that undergoes a ray deflecting action by the first diffractive liquid crystal lens and f2 is a focal length of the second diffractive liquid crystal lens with order light identical with the preset order light relative to incident light that has a second polarization direction perpendicular to the first polarization direction and that undergoes the ray deflecting action by the second diffractive liquid crystal lens.

5. An image pick-up device having the optical system stated in claim 4, an image sensor, and a zoom optical system.

6. An optical system according to claim 1, satisfying the following condition:

$|\Delta/f| \leq 0.6$ where $\Delta$ is a spacing between the first diffractive liquid crystal lens and the second diffractive liquid crystal lens and f is a focal length of the optical system.

7. An image pick-up device having the optical system stated in claim 6, an image sensor, and a zoom optical system.

8. An image pick-up device having the optical system stated in claim 1, an image sensor, and a zoom optical system.

9. An optical system according to claim 1,
   wherein a lens with positive refracting power and a lens with negative refracting power are arranged on each of an object side and an image side of the liquid crystal optical element.

10. An image pick-up device having the optical system stated in claim 9, an image sensor, and a zoom optical system.

* * * * *